United States Patent
Breviere et al.

(10) Patent No.: US 11,491,465 B2
(45) Date of Patent: Nov. 8, 2022

(54) SILICA-BASED STATIONARY PHASE FOR A CHROMATOGRAPHY COLUMN AND METHODS FOR PRODUCING THE SAME

(71) Applicants: GEOSERVICES EQUIPEMENTS, Roissy en France (FR); LA SOCIETE DES AMIS DE L'ECOLE SUPERIEURE DE PHYSIQUE ET CHIMIE INDUSTRIELLES DE LA VILLE DE PARIS, Paris (FR)

(72) Inventors: Jerome Breviere, Roissy-en-France (FR); Joachim Pragash Fleury, Paris (FR); Jerome Vial, Châtillon (FR); Didier Thiébaut, Paris (FR); Anouar Essoussi, Villeneuve la Garenne (FR); Imadeddine Azzouz, Fresnes (FR); Kamran Danaie, Vincennes (FR)

(73) Assignees: GEOSERVICES EQUIPEMENTS, Roissy en France (FR); LA SOCIETE DES AMIS DE L'ECOLE SUPERIEURE DE PHYSIQUE ET CHIMIE INDUSTRIELLES DE LA VILLE DE PARIS, Paris (FR)

( * ) Notice: Subject to any disclaimer, the term of this patent is extended or adjusted under 35 U.S.C. 154(b) by 1588 days.

(21) Appl. No.: 15/522,897

(22) PCT Filed: Nov. 5, 2015

(86) PCT No.: PCT/EP2015/002228
§ 371 (c)(1),
(2) Date: Apr. 28, 2017

(87) PCT Pub. No.: WO2016/070999
PCT Pub. Date: May 12, 2016

(65) Prior Publication Data
US 2017/0312735 A1    Nov. 2, 2017

(30) Foreign Application Priority Data
Nov. 5, 2014   (EP) .................................. 14290332

(51) Int. Cl.
*B01J 20/286*    (2006.01)
*B01J 20/10*     (2006.01)
(Continued)

(52) U.S. Cl.
CPC .......... *B01J 20/286* (2013.01); *B01J 20/103* (2013.01); *B01J 20/28097* (2013.01);
(Continued)

(58) Field of Classification Search
CPC . G01N 30/52; G01N 2030/528; B01J 20/103; B01J 20/286; B01J 20/28097;
(Continued)

(56) References Cited

U.S. PATENT DOCUMENTS 6,663,697 B1   12/2003   Kottenstette et al.
7,032,444 B2   4/2006   Breviere et al.
(Continued)

FOREIGN PATENT DOCUMENTS

WO   WO2003006133 A2   1/2003
WO   WO2004065955 A1   8/2004
WO   WO2009135115 A1   11/2009

OTHER PUBLICATIONS

Katalin Sinko, Influence of Chemical Conditions on the Nanoporous Structure of Silicate Aerogels, Materials, 2010, 3, 704-740.
(Continued)

*Primary Examiner* — Vishal V Vasisth
(74) *Attorney, Agent, or Firm* — Jeffrey D. Frantz

(57) ABSTRACT

A silica-based stationary phase for chromatography columns and the methods of preparing such. More particularly, but not by way of limitation, a silica-based stationary phase that
(Continued)

is substantially free of polyethers (e.g., polymer glycols). Also, a chromatography column comprising a silica-based stationary phase substantially free of polyethers (e.g., polymer glycols) within its channels as either a thin-film coating and/or a monolith and/or a monolithic coating. More particularly, a micro-electro-mechanical system (MEMS) chromatograph comprising a silica-based monolith substantially free of polyethers (e.g., polymer glycols) as the stationary phase within the micro-channels of the column.

13 Claims, 13 Drawing Sheets

(51) Int. Cl.
*B01J 20/28* (2006.01)
*B01J 20/30* (2006.01)
*G01N 30/52* (2006.01)

(52) U.S. Cl.
CPC ....... *B01J 20/3071* (2013.01); *B01J 20/3085* (2013.01); *G01N 30/52* (2013.01); *B01J 2220/82* (2013.01); *B01J 2220/86* (2013.01); *G01N 2030/528* (2013.01)

(58) Field of Classification Search
CPC ................ B01J 20/3085; B01J 20/3071; B01J 2220/86; B01J 2220/82
See application file for complete search history.

(56) References Cited

U.S. PATENT DOCUMENTS

| 7,600,413 B2 | 10/2009 | Shah et al. |
| 8,685,366 B2 | 4/2014 | Chaumonnot et al. |
| 2011/0011156 A1 | 1/2011 | Guieze |
| 2013/0174642 A1 | 7/2013 | Bourlon et al. |
| 2013/0206665 A1* | 8/2013 | Wyndham .............. B01J 20/285 502/402 |

OTHER PUBLICATIONS

Svec and Kurganov, Less common applications of monoliths: III. Gas chromatography, Journal of Chromatography A, Mar. 14, 2008, vol. 1184 Issues(1-2): pp. 281-295.

International Search Report and Written Opinion issued in the related PCT application PCT/EP2015/002228, dated Jan. 29, 2016 (14 pages).

Ryoji Takahashi et al., "Fabrication of Gas Chromatography Glass Capillary Columns with Silica Gel Layer on the inner surface utilizing Sol-Gel Phase Separation", Journal of the Ceramic Society of Japan, Jan. 1, 2005, pp. 634-636.

Galarneau A et al., "Spherical ordered mesoporous silicas and silica monoliths as stationary phases for liquid chromatography", Journal of Seperation Science, Wiley, DE, vol. 29, No. 6, Apr. 1, 2006, pp. 844-855.

Motokawa M. et al., "Monolithic silica columns with various skeleton sizes and through-pore sizes for capillary liquid chromatography", Journal of Chromatography, vol. 961, No. 1, Jun. 28, 2002, pp. 53-63.

Chia-Min Yang et al: "Chemical removal of organic polymers from highly porous sol-gel-derived silica monoliths", New Journal of Chemistry, vol. 28, No. 12, Jan. 1, 2004, p. 1520.

Extended European Search Report issued in the related EP Application 14290332.7, dated Jun. 9, 2015 (9 pages).

Communication pursuant to article 94(3) EPC issued in the related EP Application 14290332.7, dated Apr. 4, 2017 (8 pages).

International Preliminary Report on Patentability issued in the related PCT application PCT/EP2015/002228, dated May 9, 2017 (9 pages).

\* cited by examiner

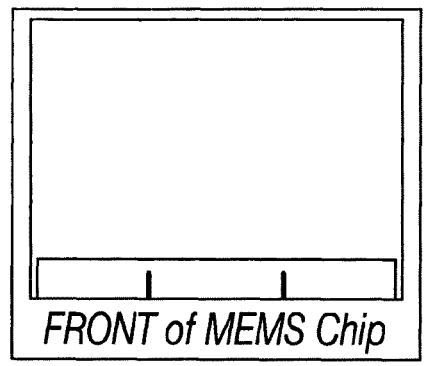
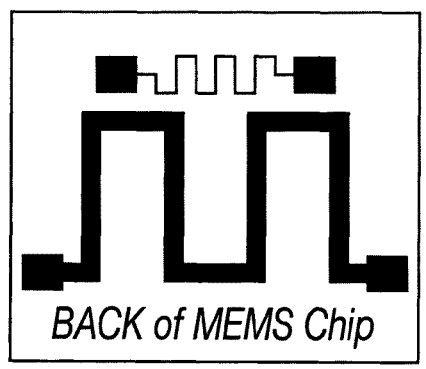
FIG. 3A
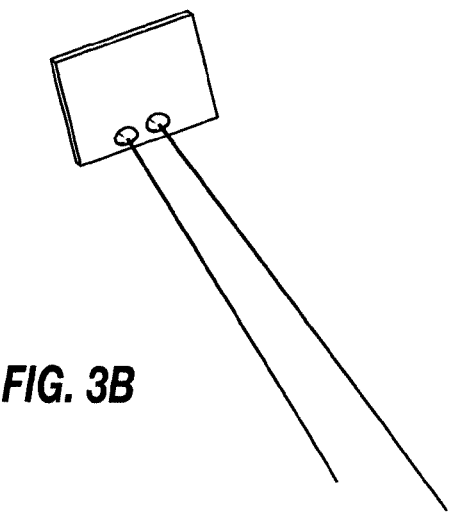
FIG. 3B

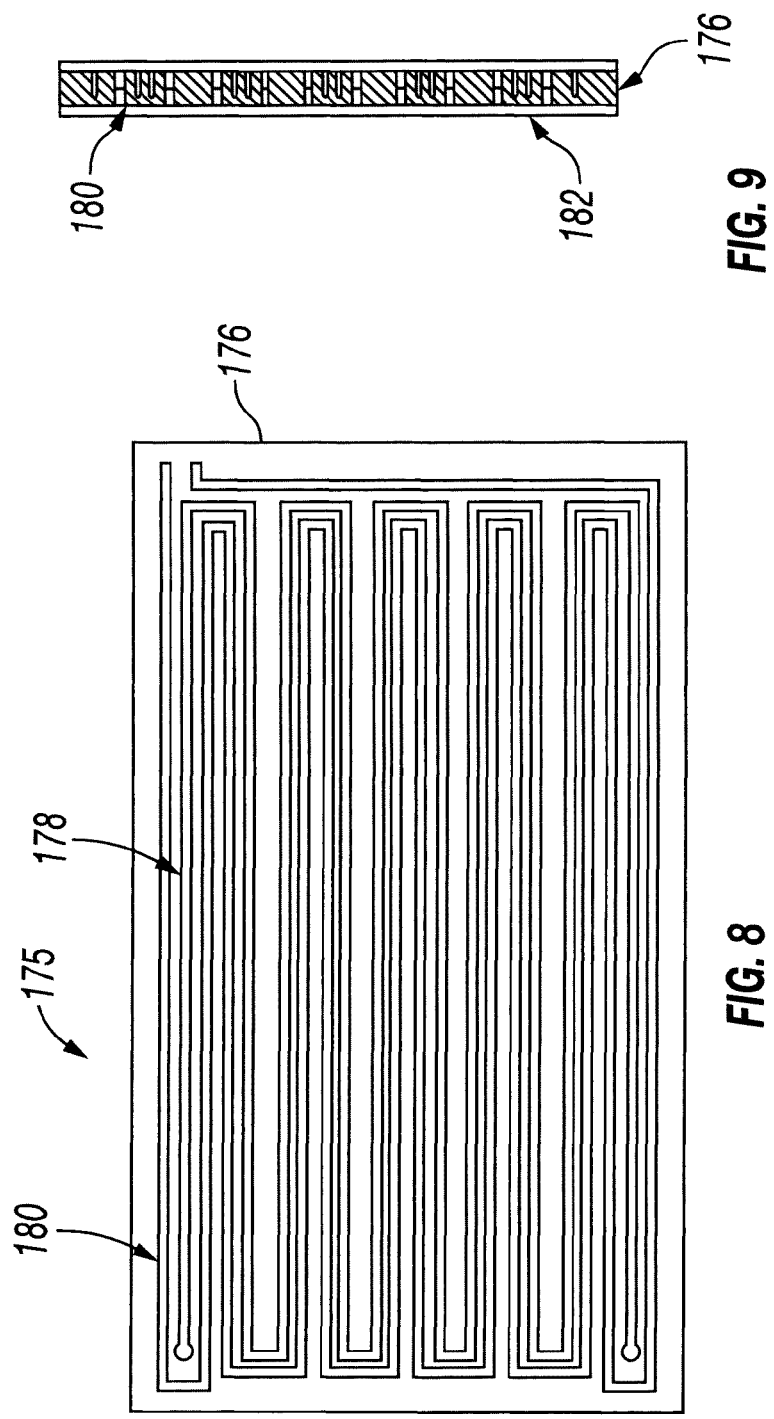

SILICA-BASED STATIONARY PHASE FOR A CHROMATOGRAPHY COLUMN AND METHODS FOR PRODUCING THE SAME

This application is a 371 of PCT/EP2015/002228, filed Nov. 5, 2015.

BACKGROUND

1. Technical Field

The presently disclosed and/or claimed inventive concept(s) relates generally to a silica-based stationary phase for a chromatography column and the methods of preparing such. More particularly, but not by way of limitation, the presently disclosed and/or claimed inventive concept(s) relates to a silica-based stationary phase that is substantially free of polyethers. The presently disclosed and/or claimed inventive concept(s) is also directed to a chromatography column comprising a stationary phase within the column, wherein the stationary phase comprises a silica-based stationary phase coating and/or monolith substantially free of polyethers. More particularly, the presently disclosed and/or claimed inventive concept(s) is directed to a capillary chromatography column and/or a micro-electro-mechanical system (MEMS) chromatography column comprising a stationary phase within the column, wherein the stationary phase comprises a silica-based coating and/or monolith substantially free of polyethers.

2. Background

Chromatography analysis has been used for more than 50 years within the oil and gas field to separate and quantify the different components, analytes, and/or molecules found in oil and/or gas reservoir fluids. Until recently, the technology associated with chromatographs was stagnant, requiring large, cumbersome equipment for chromatographic analysis, thereby necessitating off-site analysis of samples obtained from, for example, oil and/or gas reservoir fluids collected during drilling or pre-drilling operations.

Recently, however, efforts have increased to reduce the size of chromatography analyzers for many applications other than just oil and gas analysis without reducing the quality of the results produced therefrom. In particular, a micro-electro-mechanical system (MEMS) chromatograph, such as the one described in U.S. Pat. No. 7,600,413, hereby incorporated by reference herein in its entirety, was recently developed and is small enough to be used at "on-site" locations and is also capable of producing a $C_1$ to $C_5$ gas composition analysis in less than 20 seconds (as compared to the prior industry standard of about 1 minute), while further being able to detect and quantify compounds other than hydrocarbons, such as carbon dioxide ($CO_2$) and hydrogen sulfide ($H_2S$), depending on the detector used. The approximately 40 second reduction in separation and detection time for the hydrocarbon gases using the above-mentioned MEMS chromatograph is highly useful in the oil and gas industry where rapid and continuous mud gas logging or fluid logging is needed to continuously monitor the drilling process in a real time capacity to ensure safety and understanding of the formation as it is being drilled.

In more detail, as hydrocarbon wellbores are being drilled, hydrocarbons from the formation mix with the drilling fluid and return to the surface. Mud gas logging or fluid logging is the continuous monitoring of these hydrocarbons (and other components), whereby the hydrocarbons are first extracted from the drilling fluid with a specific degasser, e.g., the Geoservices extractor described in U.S. Pat. No. 7,032,444, hereby incorporated by reference herein in its entirety. After extraction, the gaseous hydrocarbons ("mud gasses") are analyzed using a primary analytical tool, e.g., a gas chromatograph, to evaluate the hydrocarbons both quantitatively and qualitatively in order to characterize the gas and/or oil formation as well as pre-evaluate the fluids therein. As such, it is useful to not only have micro-scale gas chromatographs "on site" that are capable of decreasing the separation time, which thereby decreases the overall time for analysis, but it is also useful for such gas chromatographs to produce clear and reliable results.

Broadly, a gas analyzer (i.e., a gas phase chromatograph) has three main parts comprising: (i) a sample injection system, (ii) an analytical line comprising a separation column (i.e., a chromatography column) and a detector, and (iii) an electronic card linked to a non-transitory computer readable medium, an example of which, without limitation, can be a global acquisition system, whereby the acquisition system is able to distinguish and recognize the signal from each detector and rebuild a global and coherent sequence of analysis taking into account each signal independently, such that the electronic card is capable of controlling the operation of the gas analyzer to analyze effluent samples. In particular, each separation column (e.g., a capillary chromatography column or the above-referenced micro-scale MEMS chromatography column) has an input to receive the gas sample, a stationary phase to separate components within the gas sample, and an output to expel the components of the gas phase from the stationary phase to be detected by, for example, a Thermal Conductivity Detector, a Flame Ionization Detector, or a Mass Spectrometer.

As used herein, the terms "chromatography column", "separation column", or "column", unless specifically clarified further, can comprise, for example but without limitation, one or more capillary chromatography columns (e.g., fused-silica capillary tubes) or one or more MEMS chromatography columns. Additionally, "capillary chromatography column" and "MEMS chromatography column" are also understood herein to be synonymous with simply "capillary column" and "MEMS column", respectively. Furthermore, it is understood by persons of ordinary skill in the art that MEMS chromatography columns can comprise both a MEMS channel and capillaries (e.g., fused-silica capillary tubes) connected to the MEMS channel as inlets and outlets to the MEMS channel.

Standard methods exist for fabricating a MEMS column including forming a functionalized or coated microfluidic channel or plurality of channels etched into a substrate comprising silicon and/or other suitable materials, which is then covered with a glass, silicon, metal, or metallized cover to seal in the microfluidic channel(s). In one method, microchannels can be formed by coating silicon wafers with a photoresist material and, thereafter, etching one or more channel patterns into the coated silicon wafers using, for example, the Deep Reactive Ion Etching (DRIE) technique, and thereafter sealing the etched silicon wafer with a glass, silicon, metal, or metallized cover.

Additionally, various methods are known for the fabrication of the stationary phase coated on the inner surface and/or introduced within, for example but without limitation, a MEMS column or a capillary column. The stationary phase is further well-known to directly correspond to the quality of separation functionality of the respective column(s). In other words, the separation functionality of a chromatography column is enabled by the stationary phase or packing material that coats the inner walls or fills the space inside the column. In the case of natural gas analysis, the stationary phase traditionally has been based on polydimethylsiloxane (PDMS). Some examples of conventional packing materials used as solid stationary phases are silica, alumina, molecular sieves, charcoal, graphite, and other carbon based materials, as well as porous polymer materials. Silica gel, alumina, and charcoal, for example, have been known for more than 50 years as useful packing materials for the separation of alkanes and non-polar components in chromatography.

As suggested above, it has been previously discovered that the stationary phase has a useful impact on the separation time and quality of separation of the components in, for example but without limitation, a gas as it passes through a chromatography column. If the components in the gas are not clearly separated, then it becomes difficult to obtain an accurate analysis of the amount of, for example, $C_1$-$C_5$ components (alkanes having 1 to 5 carbon atoms) in a sample of mud gas obtained from drilling fluids. Presently, chromatography columns, in particular MEMS columns, have been produced using a standard coating process mainly comprising: dissolving a polydimethylsiloxane ("PDMS") stationary phase in a solvent, coating the solution of PDMS stationary phase and solvent on the inner walls of the chromatography column, and thereafter removing the solvent. The stationary phases produced by such a process do not provide good separation performances for chromatography columns, especially for the most volatile compounds, when subjected to very short retention times as required by industries like the oil and gas industry where mud logging must be done continuously during the drilling process in as close to real time as possible.

As used herein, the term "carrier gas" is defined as a mobile phase capable of carrying a small, defined volume of fluid (e.g., a sample) through a separation column (comprising the stationary phase) such that the fluid can be analyzed. "Carrier gas" can comprise, for example but without limitation, an inert gas (not reacting with the stationary phase) such as helium or an unreactive gas such as nitrogen, air, hydrogen, and/or carbon dioxide.

It has also been previously discovered that a new stationary phase deposition technique of sputtering the stationary phase, e.g., silica, on the substrate (i.e., inner walls) of a MEMS chromatography column results in a better manufacturing process for providing low cost MEMS chromatography columns with enhanced reproducibility, as described in US 2013/0174642, hereby incorporated by reference herein in its entirety. However, it has also been found that chromatography columns, specifically MEMS chromatography columns, produced by such a technique do not provide sufficient separation performance for mud logging applications unless very strong temperature ramps (variation of the temperature in function of time) are used, which leads to a long cool down time in between each sample and increases the total chromatographic cycle time to a point at which the MEMS chromatograph is no longer useful for continuous mud logging applications.

Additionally, it has been known how to produce a silica-based monolithic stationary phase from a sol-gel solution comprising a polymer glycol(s). However, such stationary phases have also been known to not give satisfactory results due to their inability to clearly separate $C_1$ and $C_2$ components from, for example, a mud gas, which, leads to less than ideal chromatograms. As will be discussed further herein, one aspect of the presently claimed and/or disclosed invention was the discovery that a sol-gel solution comprising a polyether (for example but without limitation, a polymer glycol) leaves residual amounts of the polyether on the stationary phase, which impacts the separation capabilities of the stationary phase unless removed.

As such, a need exists for a stationary phase that provides sufficient separation performance for light hydrocarbons in chromatography columns with low retention times, like MEMS chromatography columns, in order to allow for continuous and accurate monitoring of these hydrocarbons (and other components) in, for example, mud gases during oil and/or gas drilling. Although disclosed in some embodiments herein as a MEMS chromatography column for gas chromatography, it should be noted that the presently disclosed and/or claimed inventive concept(s) directed to a stationary phase and methods of producing such can be applied to any chromatography column in the fields of, for example but without limitation, analytical and preparative liquid, gas, dense gas, and supercritical fluid chromatography, as well as capillary electrochromatography, and/or Solid Phase Extraction.

SUMMARY

The presently disclosed and/or claimed inventive concept(s) relates generally to a silica-based stationary phase substantially free of polyethers and the methods of preparing such. More particularly; but not by way of limitation, the presently disclosed and/or claimed inventive concept(s) relates to a silica-based monolithic stationary phase that is substantially free of polyethers and the methods of preparing such.

More particularly, at least one aspect of the presently disclosed and/or claimed inventive concept(s) is directed to a chromatography column comprising a coated and/or monolithic silica-based stationary phase within the column. In one embodiment, the presently disclosed and/or claimed inventive concept(s) is directed to a micro-fabricated MEMS chromatography column comprising a coated and/or monolithic silica-based stationary phase within the column, which is particularly well-suited for on-site analysis for oilfield and/or gas field application (but which may also be used in non-oilfield or non-gas field situations). Silica-based monoliths can be defined as a solid material formed of a continuous skeleton of amorphous silica with interconnected macropores and mesopores/micropores and have been found to have a high gas permeability due to the macropores and a high surface area due to the mesopores/micropores.

The process for making the stationary phase disclosed and/or claimed herein is an alternative solution to other stationary phases or packing materials generally used in separation columns for fluid analysis, and particularly those solutions used in natural gas analysis. Such a micro-fabricated column as disclosed and/or claimed herein integrates, in one non-limiting embodiment, a silica-based monolith within the column such as to be in contact with the fluid to be analyzed as the fluid passes through the column, and has been demonstrated to enhance the separation of alkanes (including isomers at least below hexane ($C_6$)), as well as the separation of nitrogen, oxygen, carbon dioxide, hydrogen sulfide, water, and other substances present in reservoir fluids.

The chromatography column incorporating the presently disclosed and/or claimed coated and/or monolithic stationary phase which is substantially free of polyethers, in at least one embodiment, is provided as part of a completely micro-fabricated MEMS chromatograph, which in its simplest form also comprises an injector and a detector as briefly described above. The injector is used to inject a small defined volume of the fluid to be analyzed into at least one of the micro-channels. This small volume of fluid is carried by a mobile gas or liquid through the separation column where the different analytes are separated and passed to the detector. The detector senses the different analytes exiting the column. The final data may be a chromatogram that is a graph (or other digitized representation of the data) in which the different analytes are seen as detected peaks as a function of time. From the chromatogram, it is possible to determine the composition of the analyzed fluid and/or to quantify each analyte constituting the analyzed fluid by qualitative and quantitative analysis.

The detailed description of the invention further sets forth numerous specific details regarding the silica-based stationary phase in order to provide a more thorough understanding of the invention, with particular regard to the implementation of the silica-based stationary phase into a gas chromatography column and its associated techniques. However, it will be apparent to one of ordinary skill in the art that the embodiments disclosed herein may be practiced with similar regard to liquid chromatography implementations and its techniques (e.g., injection, flow, separation, and the like) as well as supercritical fluid chromatography, capillary electrochromatography, microfabricated gas chromatography (as described in WO 2009/135115, which is hereby incorporated by reference in its entirety) and/or Solid Phase Extraction. In many instances, well-known features of liquid chromatography, supercritical fluid chromatography, capillary electrochromatography, and Solid Phase Extraction applications have not been described in detail in order to avoid unnecessarily complicating the description.

BRIEF DESCRIPTION OF THE FIGURES

Various aspects and embodiments of the presently claimed and disclosed inventive concept(s) are described below in the appended drawings to assist those of ordinary skill in the relevant art in making and using the subject matter herein. In reference to the appended drawings, which are not intended to be drawn to scale, like reference numerals are intended to refer to identical or similar elements. For purposes of clarity, not every component may be labeled in every drawing.

FIG. 3A is a photographic illustration of the front and back of an MEMS chip for a micro-scale chromatography column and FIG. 3B illustrates the fused-silica capillary inputs and outputs of an MEMS chromatography column.

FIG. 8 is a top view of a schematic of one embodiment of a MEMS chromatography column according to the presently disclosed and/or claimed inventive concept(s).

FIG. 9 is a cross-sectional view of one embodiment of a MEMS chromatography column of the presently disclosed and/or claimed inventive concept(s).

FIG. 10A illustrates the retention time of a column having a sputtered silica stationary phase coated on the micro-fabricated separation column inner walls and FIG. 10B illustrates the retention time of a column having a silica-based monolithic stationary phase therein according to the presently disclosed and/or claimed inventive concept(s). The stationary phases in FIGS. 10A and 10B are substantially free of polyethers.

FIG. 11A illustrates the retention time of a column comprising a silica-based monolithic stationary phase that is not substantially free of polyethers (e.g., polymer glycols) and FIG. 11B illustrates the retention time of a column comprising a silica-based monolithic stationary phase that is substantially free of polyethers therein according to the presently disclosed and/or claimed inventive. As seen in FIG. 11B, the resolution of methane/ethane significantly improved as a result of an increased retention factors (k) for the alkanes.

FIG. 12A illustrates the retention time of a column comprising a silica-based monolithic stationary phase that is not substantially free of polyethers (e.g., polymer glycols) and FIG. 12B illustrates the retention time of a column comprising a silica-based monolith stationary phase that is substantially free of polyethers therein according to the presently disclosed and/or claimed inventive.

FIG. 13A illustrates the retention time of a column comprising a silica-based monolithic stationary phase that is not substantially free of polyethers (e.g., polymer glycols) and FIG. 13B illustrates the retention time of a column comprising a silica-based monolith stationary phase that is substantially free of polyethers therein according to the presently disclosed and/or claimed inventive.

FIG. 14A illustrates the retention time of a column comprising a silica-based monolithic stationary phase that is not substantially free of polyethers (e.g., polymer glycols) and FIG. 14B illustrates the retention time of a column comprising a silica-based monolith stationary phase that is substantially free of polyethers produced by calcinating the silica-based monolithic stationary phase at 350° C. for 3 hours.

DETAILED DESCRIPTION

Figure 1A:
FIGS. 1A-1F are illustrations of some embodiments of the silica-based monolithic stationary phase disclosed and/or claimed herein, wherein the silica-based monolithic stationary phase is made by the process recited herein using tetramethyl orthosilicate (TMOS) and polyethylene glycol in a fused-silica capillary column.
Figure 1B:
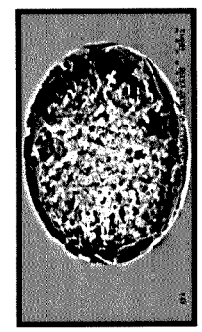
Figure 1C:
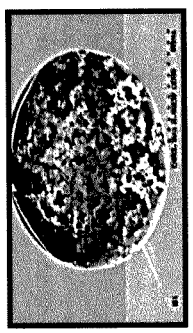
Figure 1D:
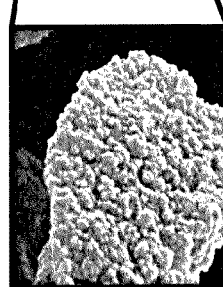
Figure 1E:
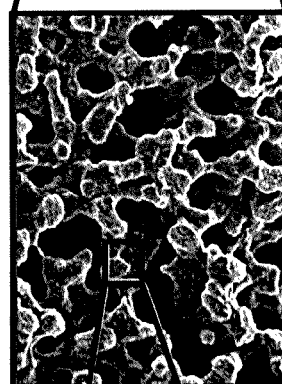
Figure 1F:
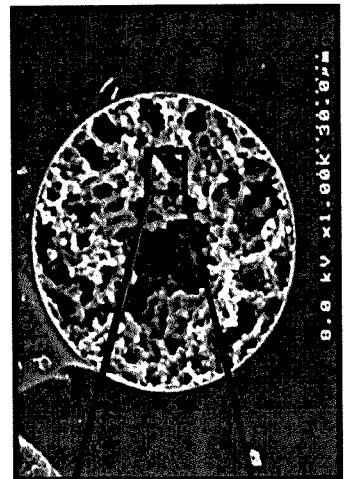

Before explaining at least one embodiment of the presently disclosed and/or claimed inventive concept(s) in detail, it is to be understood that the presently disclosed and/or claimed inventive concept(s) is not limited in its application to the details of construction and the arrangement of the components or steps or methodologies set forth in the following description or illustrated in the drawings. The presently disclosed and/or claimed inventive concept(s) is capable of other embodiments or of being practice or carried out in various ways. Also, it is to be understood that the phraseology and terminology employed herein is for the purpose of description and should not be regarded as limiting.

Unless otherwise defined herein, technical terms used in connection with the presently disclosed and/or claimed inventive concept(s) shall have the meanings that are commonly understood by those of ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the presently disclosed and/or claimed inventive concept(s) pertains. All patents, published patent applications, and non-patent publications referenced in any portion of this application are herein expressly incorporated by reference in their entirety to the same extent as if each individual patent or publication was specifically and individually indicated to be incorporated by reference.

As utilized in accordance with the present disclosure, the following terms, unless otherwise indicated, shall be understood to have the following meanings.

The use of the word "a" or "an" when used in conjunction with the term "comprising" may mean "one," but it is also consistent with the meaning of "one or more," "at least one," and "one or more than one." The use of the term "or" is used to mean "and/or" unless explicitly indicated to refer to alternatives only if the alternatives are mutually exclusive, although the disclosure supports a definition that refers to only alternatives and "and/or." Throughout this application, the term "about" is used to indicate that a value includes the inherent variation of error for the quantifying device, the method being employed to determine the value, or the variation that exists among the study subjects. For example, but not by way of limitation, when the term "about" is utilized, the designated value may vary by plus or minus twelve percent, or eleven percent, or ten percent, or nine percent, or eight percent, or seven percent, or six percent, or five percent, or four percent, or three percent, or two percent, or one percent. The use of the term "at least one" will be understood to include one as well as any quantity more than one, including but not limited to, 1, 2, 3, 4, 5, 10, 15, 20, 30, 40, 50, 100, etc. The term "at least one" may extend up to 100 or 1000 or more depending on the term to which it is attached. In addition, the quantities of 100/1000 are not to be considered limiting as lower or higher limits may also produce satisfactory results. In addition, the use of the term "at least one of X, Y, and Z" will be understood to include X alone, Y alone, and Z alone, as well as any combination of X, Y, and Z. The use of ordinal number terminology (i.e., "first", "second", "third", "fourth", etc.) is solely for the purpose of differentiating between two or more items and, unless otherwise stated, is not meant to imply any sequence or order or importance to one item over another or any order of addition.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. The term "or combinations thereof" as used herein refers to all permutations and combinations of the listed items preceding the term. For example, "A, B, C, or combinations thereof" is intended to include at least one of: A, B, C, AB, AC, BC, or ABC and, if order is important in a particular context, also BA, CA, CB, CBA, BCA, ACB, BAC, or CAB. Continuing with this example, expressly included are combinations that contain repeats of one or more item or term, such as BB, AAA, MB, BBC, AAABCCCC, CBBAAA, CABABB, and so forth. The skilled artisan will understand that typically there is no limit on the number of items or terms in any combination, unless otherwise apparent from the context.

The presently disclosed and/or claimed inventive concept(s) is directed to a silica-based stationary phase, wherein the silica-based stationary phase is substantially free of polyethers, and the methods of preparing such. In one embodiment, the silica-based stationary phase is used in, for example but without limitation, a chromatography column. In an alternative embodiment, the silica-based stationary phase can be used in an extraction column or a precolumn. In a further embodiment, the silica-based stationary phase can be used in processes related to catalysis, gas capture and storage, gas purification, and/or battery materials.

In another non-limiting embodiment, the silica-based stationary phase is in the form of at least one of a thin film and/or a monolith. The silica-based stationary phase, when in the form of a thin film, may comprise a coating on the inner surface of a chromatography column. The silica-based stationary phase, when in the form of a monolith, may comprise (i) a monolithic structure substantially filling the internal volume of the chromatography column or (ii) a monolithic film which comprises a coating on the walls that does not substantially fill the internal volume of the chromatography column but is still a continuous, single structure within the chromatography column. As used herein, "substantially filling" with regard to the monolithic form of the silica-based stationary phase is defined to mean that the monolith encompasses between 50 to 100% of the volume of the chromatography column. As used herein, the terms "column," "channel," "chromatography column," "microchannel," "microfluidic channel," "micro-fabricated column," "micro-column," and variations thereof, are used interchangeably to refer to a separation column or components thereof in which the presently disclosed and/or claimed silica-based stationary phase is located. Also as used herein, the term "silica-based" means that the stationary phase is produced from and/or comprises at least one silica precursor as further defined below.

Additionally, as used herein, the term "functional group" or "functionalities" refers to atoms and/or groups of atoms that give the compound, or substance to which they are linked, characteristic chemical and physical properties. A "functionalized" surface refers to the silica-based stationary phase as described herein on which chemical groups are adsorbed and/or chemically grafted.

In one embodiment, the polyethers, as recited herein, have a molecular weight less than 300,000 Daltons, or a molecular weight less than 100,000 Daltons. The polyethers can be, for example but without limitation, polyethers having at least one hydroxyl functional group, wherein the individual polyethers have a molar mass less than or equal to 100,000 Daltons. In another embodiment, the polyether(s) having at least one hydroxyl functional group has a molar mass less than or equal to 100,000 Daltons and at least one of the terminal groups comprises hydroxyl functional group. The polyethers having at least one hydroxyl functional group can comprise (i) polymers comprising, for example, polyethylene glycol, polypropylene oxide, polyethylene oxide, polypropylene glycol, poly(p-phenylene oxide), and/or methoxypoly(ethylene glycol), (ii) two-block copolymers comprising poly(alkylene oxide) chains, (iii) three-block copolymers comprising poly(alkylene oxide) chains (e.g., poloxamers), (iv) four-block copolymers comprising poly(alkylene oxide) chains, and combinations thereof.

In one embodiment, the polyether(s) have at least one hydroxyl functional group comprising a polymer glycol having a molar mass with an upper limit of about 100,000 Daltons. The polymer glycol can be selected from the group consisting of polyethylene glycol (PEG), polypropylene glycol (PPG), methoxypoly(ethylene glycol) (mPEG), and poloxamers. As used herein, the plural term "polyethers" also encompasses the singular term "polyether" and vice versa, such that when referencing either the "polyethers," "polyethers having at least one hydroxyl functional group," "polyether," or "polyether having at least one hydroxyl functional group" it is implicit that one or more polyethers may be referenced.

As used herein, "substantially free" with regard to the amount of the above-described polyether(s) in the stationary phase is defined to mean that the stationary phase comprises less than 15%, or less than 7%, or less than 2% polyethers which have at least one hydroxyl functional group.

In one embodiment, the silica-based stationary phase, which is substantially free of polyethers, is the product of a polymerized sol-gel (i.e., "gelation") that has been washed with an acid to substantially remove the polyethers from the polymerized sol-gel and, optionally, has thereafter been washed with a basic neutralization solvent and/or dried. The polymerized sol-gel, prior to being washed with the acid to substantially remove the above-described polyethers, comprises the reaction products of a silica precursor, a polyether, a solvent, and, optionally, a catalyst.

As used herein, the term "sol-gel" refers to a composition wherein the monomers therein undergo a conversion into a colloidal solution ("sol") that acts as the precursor for an integrated network ("gel") of either discrete particles or network particles. As described herein, one non-limiting example of a sol-gel is a composition comprising a polymerized reaction product of a silica precursor, polymer glycol, solvent, and, optionally, a catalyst.

The silica precursor as disclosed herein can comprise a silicon-containing composition selected from the group consisting of methyltrimethoxysilane (MTMS), dimethyldimethoxysilane (DMDMS), methyltriethoxysilane (MTES), dimethyldiethoxysilane (DMDES), polyethoxydisiloxanes (PEDS-Px), alkoxysilanes, and combinations thereof. The alkoxysilanes can be selected from the group consisting of tetramethyl orthosilicate (TMOS), tetraethyl orthosilicate (TEOS), n-propyl orthosilicate, i-propyl orthosilicate, and combinations thereof. In one embodiment, the silica precursor comprises tetramethyl orthosilicate. One of ordinary skill in the art would recognize, however, that any silica precursor commonly used in the synthesis of a silica-based material derived from a sol-gel could be used in the presently disclosed and/or claimed inventive concept(s).

The solvent, as disclosed herein, can comprise water. The solvent can also comprise water and an alcohol such as, for example, methanol, ethanol, n-propanol, iso-propanol, tert-butanol, and combinations thereof.

The catalyst as disclosed herein comprises at least one of an acid and/or a base, wherein the acid does not comprise hydrofluoric acid. The acid can be selected from the group consisting of hydrochloric acid, nitric acid, oxalic acid, acetic acid, and combinations thereof. The base can be selected from the group consisting of ammonia, sodium hydroxide, and combinations thereof.

In one non-limiting embodiment, the silica-based stationary phase is a monolithic stationary phase that substantially fills the internal volume of the chromatography column. In another non-limiting embodiment, the silica-based stationary phase is a monolithic film which comprises a coating on the walls that does not substantially fill the internal volume of the chromatography column but is still a continuous, single structure on the walls within the chromatography column. In yet another non-limiting embodiment, the silica-based stationary phase is a coating on the inner walls of the chromatography column. An illustration of the non-limiting embodiment wherein the silica-based monolithic stationary phase substantially fills the chromatography column, as disclosed and/or claimed herein, is presented in FIGS. 1A-1F, wherein the silica-based monolithic stationary phase is made by the process recited herein using tetramethyl orthosilicate (TMOS) and polyethylene glycol.

Additionally, the presently disclosed and/or claimed inventive concept(s) encompasses a method for making a silica-based stationary phase, which is substantially free of the above-described polyethers. In one embodiment, the presently disclosed and/or claimed inventive concept(s) encompasses a method for making a chromatography column comprising a silica-based stationary phase, which is substantially free of the above-described polyether(s), wherein the internal surface of the chromatography column is in contact with at least a portion of the stationary phase. In one embodiment, the stationary phase comprises a monolith substantially filing the volume of the chromatography column. In another embodiment, the stationary phase comprises a monolithic film on the internal surface(s) of the chromatography column. In yet another embodiment, the stationary phase comprises a thin film on the internal surface(s) of the chromatography column.

The method comprises the steps of: (i) washing the inside of a chromatography column that is at least partially in contact with a polymerized sol-gel therein, wherein the polymerized sol-gel comprises a silica precursor, a polyether, a solvent, and, optionally, a catalyst, with an acid to substantially remove the polyethers from the polymerized sol-gel, wherein the acid is at least one of an organic acid and a mineral acid, and further wherein the acid does not comprise hydrofluoric acid; (ii) washing the inside of the acid-washed chromatography column with a basic neutralization solvent; and (iii) drying the inside of the neutralized chromatography column to form a silica-based stationary phase substantially free of the polyether.

The above-described method, wherein the polymerized sol-gel can be formed by the following steps comprising (a) preparing a sol-gel solution comprising the above-described silica precursor, polyether, solvent, and, optionally, catalyst; (b) introducing the sol-gel solution into the chromatography column such that the sol-gel solution is at least partially in contact with a portion of the internal surface of the chromatography column; and (c) heating the chromatography column to polymerize the sol-gel solution. The process by which the reactants of the sol-gel solution interact to form the polymerized sol-gel is described in U.S. Pat. No. 8,685,366 and *Materials*, 2010, 3, 704-740, which are both hereby incorporated by reference herein in their entirety.

Figure 2:
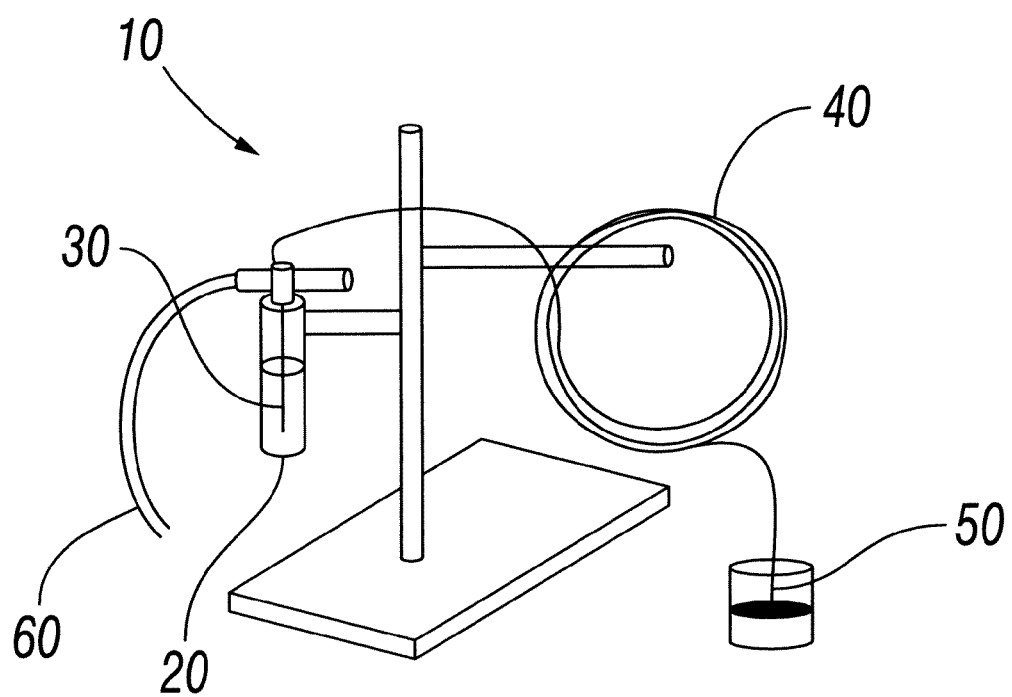
FIG. 2 is a schematic of a gas pressure apparatus that can be used to introduce a sol-gel solution into a chromatography column to form a stationary phase therein.

Referring to the above recited method and resulting silica-based stationary phase, the step of introducing the sol-gel solution into the chromatography column is carried out by an instrumentation selected from the group consisting of a precision flow controller, a pump, a syringe pump, and combinations thereof. The instrumentation for introducing the sol-gel solution into, for example but without limitation, a fused-silica capillary chromatography column may comprise a gas pressure apparatus as illustrated in FIG. 2, wherein the gas pressure apparatus 10 comprises a sealed reservoir 20, wherein one end 30 of a fused-silica capillary tube 40 is submerged in sol-gel solution in the sealed reservoir 20 and the other end 50 of the fused-silica capillary tube 40 is either (i) left open if only coating the inside of the column and/or (ii) closed to form a monolith inside of the column, and wherein the sealed reservoir 20 has an inlet 60 for a pressurized gas, for example but without limitation, helium to be introduced into the sealed reservoir 20 to force the sol-gel solution into and/or through the column. The above-described instrumentation for introducing the sol-gel solution into the chromatography column can also be used for any of the above-described steps of washing the column with the acid and/or neutralization solvent.

Again, referring to the above-recited method and resulting silica-based stationary phase, the step of heating the chromatography column to form the polymerized sol-gel (i.e., "gelation") from the above-described sol-gel solution comprises heating the chromatography column at a temperature in a range of from about 20° C. to about 80° C. and for a time in a range of from about 3 h to about 72 h. In one embodiment, the step of heating the above-described sol-gel solution to form the polymerized sol-gel (i.e., "gelation") comprises heating the sol-gel solution at 40° C. for a time in a range of from about 12 hours to about 24 hours. A person of ordinary skill in the art would recognize that the time and temperature can influence the porosity, permeability, and retention time of the silica-based stationary phase comprised of the polymerized sol-gel, which can be varied without undue experimentation to achieve different characteristics of such. See Svec and Kurganov, J. Chrom. A., 2008 Mar. 14, 1184(1-2): 281-295, which is hereby incorporated by reference in its entirety.

Also referring to the above-recited method and resulting silica-based stationary phase, the acid used to wash the silica-based stationary phase is selected from the group consisting of an organic acid, mineral acid, and combinations thereof, wherein the acid has a pH less than 5. In one embodiment, the acid has a pH in a range of from about −1.5 to about 5, wherein the molarity is adjusted to maintain the pH within the range. More particularly, the acid comprises an organic acid selected from the group consisting of a carboxylic acid, sulfonic acid, and combinations thereof. The carboxylic acid is selected from the group consisting of acetic acid, formic acid, propionic acid and combinations thereof. Alternatively or additionally, the acid comprises a mineral acid selected from the group consisting of sulfuric acid, nitric acid, hydrochloric acid, and combinations thereof.

The column can be washed with the above-disclosed acids for a time dependent on the volumetric flow rate of the acid such that the column is washed with a volume of acid of at least five times the volume of the column or at least ten times the volume of the column. It should be recognized that the volume of acid necessary to wash the column with the above-disclosed acids can vary depending on the strength (i.e., pH) of the acid, such that an acid with a low pH (e.g., −1.5) would require a lesser amount than an acid with a higher pH (e.g., 5). This step allows for the above-described polyether remaining on the silica-based stationary phase to be substantially removed by at least one of the following processes resulting from the acid treatment: (a) the polyether undergoes a desorption process if the polyether had adsorbed on the silica, (b) the polyether undergoes a degradation/hydrogenation process whereby the molecule of the polyether splits into smaller pieces with a smaller weight allowing an easier solubilization into a solvent (i.e., partial decomposition of the polyether via ether cleavage), and/or (c) the polyether undergoes a hydrolysis reaction whereby the covalent bond between the silicon and polyether (e.g., Si—O-PEG) is broken allowing the polyether (e.g., PEG) to be removed from the silica-based stationary phase.

Referring again to the above-recited method and resulting silica-based stationary phase, the step of washing the column after the acid wash comprises washing the column with a basic neutralization solvent comprising, for example, water or deionized water. The column can be washed with the basic neutralization solvent, in particular for a time dependent on the volumetric flow rate of the neutralization solvent such that the column is washed with a volume of the basic neutralization solvent of at least five times the volume of the column or at least ten times the volume of the column. After washing the column with basic neutralization solvent, the column can be dried at a temperature in a range of from about 20° C. to about 200° C. for a time in a range of from about 30 min to about 72 h. In one embodiment, the column is dried at about 120° C. for about 10 hours (1° C./min). Optionally, prior to drying the neutralized chromatography column, the column can be washed with a water-miscible solvent, in particular for a time dependent on the volumetric flow rate of the water-miscible solvent such that the column is washed with a volume of water-miscible solvent of at least five times the volume of the column or at least ten times the volume of the column. In one embodiment, the water-miscible solvent is more volatile than water. The water-miscible solvent may comprise an organic solvent selected from the group consisting of alcohols, ketones, esters, and combinations thereof. In one non-limiting embodiment, the water-miscible solvent is selected from the group consisting of methanol, ethanol, n-propanol, iso-propanol, tert-butanol, acetone, butanone, ethyl acetate, and combinations thereof.

The chromatography column, as will be further described below, can be a regularly sized chromatography column comprising one or more fused-silica capillaries and/or can be a micro-sized MEMS-based chromatography column. Specifically, the chromatography column can be selected from the group consisting of a Micro-Electro-Mechanical-System (MEMS) column, fused-silica capillary column, and combinations thereof. An illustration of a micro-sized MEMS chromatography column is presented in FIGS. 3A and 3B, wherein FIG. 3A illustrates the front and back of an MEMS chip containing the MEMS chromatography column and FIG. 3B illustrates the inputs and outputs of an MEMS chromatography column, wherein the inputs and outputs are comprised of fused-silica capillaries with an inner diameter of about 100 μm, an outer diameter of about 375 μm, and a length of about 10 cm. The inputs and outputs comprised of fused-silica capillaries for the MEMS chromatography column, as described above, can have a length in a range of from about 3 cm to about 50 cm and an inner diameter in a range of from about 25 um to about 300 um. The chromatography column, as described herein, can comprise an MEMS column in addition to other micro-machined chromatograph parts such that the MEMS column and accompanying parts can be placed into a 19 inch rack.

As stated above, the chromatography column can also comprise a fused-silica capillary, wherein the fused-silica capillary comprises an inner diameter in a range of from about 25 to about 300 μm and a length in a range of from about 0.25 m to about 3 m in place of, for example but without limitation, the MEMS column specifically where strong temperature ramps are not necessary. In one embodiment, the chromatography column comprises a fused-silica capillary with an inner diameter of 75 μm and a length of 0.7 m.

Figure 4A:
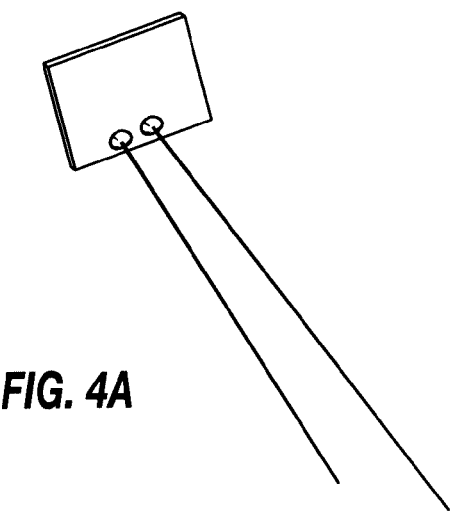
FIGS. 4A-4C are pictorial illustrations of: (4A) a MEMS-based chromatography column comprising fused-silica capillary inputs and outputs having an inner diameter of 100 μm, with a silica-based monolith as the stationary phase therein, connected to a MEMS microchip housing the MEMS chromatography channel also having a silica-based monolithic stationary phase therein; and (4B & 4C) SEM images at ×900 magnification of two silica-based monolithic stationary phases inside the fused-silica capillaries.
Figure 4B:
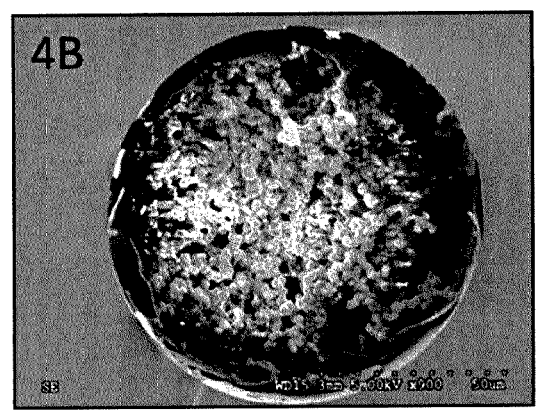
Figure 4C:
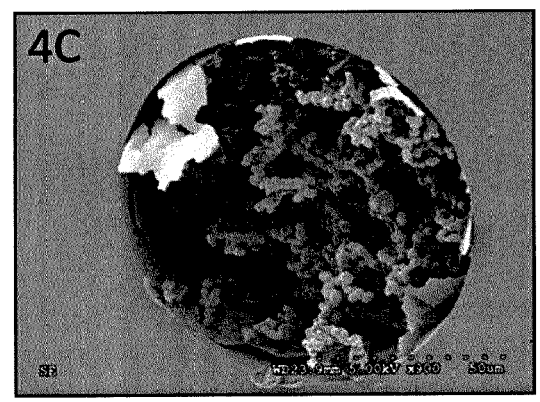

Additionally, the chromatography column can comprise one or more fused-silica capillaries in combination with an MEMS chromatography column, wherein both the MEMS chromatography column and the input and output comprised of fused-silica capillaries have stationary phases therein. FIGS. 4A-4C are pictorial illustrations of (4A) a MEMS chromatography column with an input and output comprised of fused-silica capillaries having an inner diameter of 100 μm and (4B & 4C) SEM images at ×900 magnification of two silica-based monolithic stationary phases inside the capillaries.

Furthermore, chromatographs, used in both gas and liquid phase chromatography, rely on discrete hollow columns or channels which contain a stationary support material (i.e., "stationary phase") for separation of fluids passing there through, particularly complex mixtures of gases and/or liquids. In one embodiment, the presently disclosed and/or claimed inventive concept(s) is directed to a chromatography system having MEMS components, e.g., a MEMS chromatography column, wherein the column at least partially encompasses a silica-based stationary phase substantially free of polyethers, more particularly a silica-based monolithic stationary phase substantially free of polyethers. It should be noted that a person of ordinary skill in the art would recognize that the presently claimed invention, in particular the embodiment directed to a MEMS chromatography column, could be used in conjunction with a chromatograph apparatus for use in wellbores, as described in US 2013/0174642 and incorporated by reference herein in its entirety.

It is to be further appreciated that the presently disclosed and/or claimed inventive concept(s) is not limited in its application to the details of construction and the arrangement of components set forth in the following description, embodiments, examples, or as illustrated in the drawings. The presently disclosed and/or claimed concept(s) is capable of other embodiments and of being practiced or of being carried out in various ways. For example, it is to be appreciated that the chromatography apparatus described herein as a micro-chromatograph comprising a silica-based stationary phase substantially free of polyethers is not limited to use with or in boreholes (above ground, or belowground) or other gas field or oilfield situations and may be used in a variety of environments and applications such as, for example but without limitation, other underground applications, underwater and/or space applications or any application where it is desirable to have micro-scale chromatograph, such as in an underground mine, a gas or oil pipeline, or in a residential or commercial building or structure. Additionally, the presently disclosed and/or claimed concept(s) is capable to be used in refinery gas analysis (RGA), petrochemical industry, or in the polymer sector to, for example but without limitation, control the quality of monomers used to synthesize polymers. For example, the presently disclosed and/or claimed chromatography apparatus described herein as a micro-chromatograph comprising a silica-based stationary phase substantially free of polyethers may be designed and constructed in such a manner as to be sized so that an individual person or animal can carry the unit for use in circumstances where the ability to use a chromatograph is desirable but was previously not feasible due to the size and bulkiness of chromatographic units.

However, it should also be appreciated that the presently disclosed and/or claimed inventive concept(s) directed to a silica-based stationary phase substantially free of polyethers (e.g., polymer glycols)—more particularly a silica-based monolith stationary phase substantially free of polyethers (e.g., polymer glycols)—can be incorporated into either a micro-chromatograph as described above and/or into a regular sized chromatograph for use at off-site locations in, for example, a laboratory or testing facility for chromatographic analysis.

Embodiments disclosed herein, and briefly mentioned above, relate to a fluid analyzer, e.g., a chromatography column that is, in one embodiment, at least partially (or completely) disposed or formed upon a substrate such as a silicon-based substrate, for example a microchip. The substrate upon which the fluid analyzer and/or separation column component is disposed, formed, or otherwise constructed (which may also be referred to herein as a "wafer") for example, of silicon, glass, sapphire, or various types of other materials, such as gallium arsenide, or a Group III-IV material. The substrate can either be doped or undoped and can be provided with a variety of orientations such as <1-0-0>, <1-1-0>, or <1-1-1>. The fluid analyzer may be connected to a sampler located at a wellhead to provide a fluid sample (some embodiments of which are a natural gas sample) from a wellbore and to a carrier fluid source for providing a carrier fluid, and includes an injector block and one or more microfabricated column blocks. The injector block of the fluid analyzer is used to create a fluid sample from the fluid, and then uses the carrier fluid to carry the fluid sample through the remainder of the fluid analyzer (i.e., the column block). As the sample is received within the one or more column blocks, the fluid sample is separated into at least two components. These components may then be eluted from the fluid analyzer, or the components may be passed onto other column blocks for further separation or detection. In one embodiment, the injector, separation column, and detector are all micro-fabricated.

In one embodiment when the fluid analyzer is a micro-chromatograph (e.g., a MEMS chromatograph), the chromatograph is disposed at least partially upon a substrate such as a silicon-based microchip, which may further comprise a valve, such as a micro-valve, which is incorporated into the fluid analyzer. The valve may be machined into the substrate, and may further comprise a flexible membrane, and a rigid substrate. In one embodiment, a loop groove and a conduit are machined or formed onto the substrate, and the flexible membrane or substrate is disposed over the substrate and the rigid membrane is disposed on top of the flexible membrane. The conduit is formed in a way such that pressure may be used to push the flexible membrane to open and close the conduit. As the conduit then opens and closes, fluid flowing through the conduit may pass through or be impeded, thereby opening and closing the valve to enter the micro-fabricated column comprising a silica-based stationary phase that is substantially free of polyethers, more particularly a silica-based monolith that is substantially free of polyethers.

The fluid analyzer or micro-fluid analyzer contemplated herein may comprise multiple column blocks for separating the fluid sample into different components. Natural gas, as contemplated herein, is any gas produced from oil or gas reservoirs from exploration to production, generally has many components, the main components being nitrogen, carbon dioxide, hydrogen sulfide, methane, and various other alkanes particularly $C_2$-$C_6$ alkanes. To separate these various components of the natural gas from one another, it may be desired to have several chromatography columns and/or micro-scale chromatography column blocks with various separation columns for use in parallel or within a series. Further, though oxygen is not naturally present within natural gas, oxygen may still contaminate the natural gas source and/or the fluid sample. Therefore, oxygen may be another component of interest to be identified in the fluid sample. Because of the various components present within the fluid sample, some embodiments of a carrier fluid used within the embodiments directed to gas chromatography applications disclosed herein is helium. Helium already has a high mobility, in addition to generally not being a component of a gas sample comprising natural gas, so this may help avoid complications when separating the components of the gas sample. However, those having ordinary skill in the art will appreciate that the presently claimed and disclosed inventive concept(s) is not limited to only the use of helium as a carrier fluid, and other gases such as nitrogen, argon, hydrogen, air, and other carrier fluids known in the art may be used.

Further still, a thermal conductivity detector (TCD) may be used for the detector to detect and differentiate between the separated components of the fluid sample. Recent developments in technology have decreased the sizes of TCDs, such as by micro-machining the TCDs, while still allowing for very accurate readings. Fluid analyzers, specifically designed for detection of natural gas components with these TCDs, may be very small, but still capable of detecting traces of gases, such as down to a few parts-per-million (ppm) or parts-per-billion (ppb). However, those having ordinary skill in the art will appreciate the presently claimed and disclosed inventive concept(s) is not so limited, and any detectors known in the art, such as flame ionization detectors (FIDs), electron capture detectors (ECDs), flame photometric detectors (FPDs), photo-ionization detectors (PIDs), nitrogen phosphorus detectors (NPDs), HALL electrolytic conductivity detectors, (UVDs) UV-Visible detectors, (RIDs) refractive index detectors, (FDs) fluorescence detectors, (DADs) diode array detectors, (IRDs) infrared detectors, and (BIDs) dielectric barrier discharge ionization detectors may be used without departing from the scope of the presently claimed and disclosed inventive concept(s). Each of these detectors may then include an electronic controller and signal amplifier when used within the fluid analyzer.

In accordance with the presently disclosed and/or claimed embodiments herein regarding the use of a silica-based stationary phase substantially free of polymer glycols in fluid analyzers (e.g., chromatographs), the fluid analyzer may be machined (e.g., micro-machined) or formed onto a substrate, such as a silicon microchip (or other micro-chip or wafer described elsewhere herein), such that the fluid analyzer includes a chromatograph as a (micro-fabricated) micro-electro-mechanical system (MEMS). As such, a sampling loop, the one or more separation columns, and each of the valves, where present, of the fluid analyzer may be formed onto the substrate. Further, due to the properties of reservoir fluids and the components included therein, in some embodiments the substrate of the fluid analyzer contemplated herein is formed from a material that is resistant to sour gases. For example, the substrate of the fluid analyzer may be formed from silicon, which is chemically inert to the sour gas components of natural gas, such as carbon dioxide and hydrogen sulfide. Similar to the substrate, in some embodiments, the flexible membranes and the rigid substrate or membrane of the micro-valve, where present, are formed from materials inert to the sour gas components of natural gas. For example, the flexible membranes may be formed from a polymer film, such as PEEK polymer film available from VICTREX, or any other flexible membrane known in the art, and the rigid substrate or membrane may be formed from glass, or any other rigid substrate known in the art.

Figure 5:
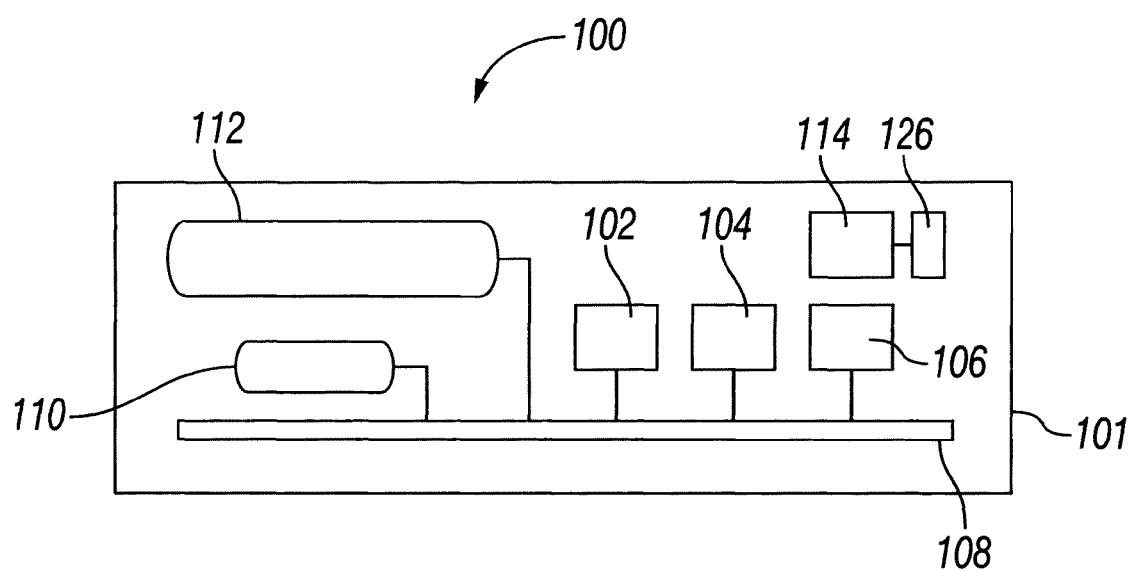
FIG. 5 is a block diagram illustrating some embodiments of a chromatography system according to the presently disclosed and/or claimed inventive concept(s).

Referring now to FIG. 5, there is illustrated in a block diagram and designated therein by the general reference numeral 100 one embodiment of a chromatography system for use either in a surface application (such as, for example but without limitation, at a well-site or in a laboratory) or in a borehole tool according to the presently claimed and disclosed inventive concept(s). The chromatography system 100 may comprise a plurality of components contained within a housing 101. These components may include, for example, an injector 102, one or more chromatography columns 104 such as the substantially polyether free silica-based (monolithic) stationary phase columns of the presently claimed and disclosed inventive concept(s) and one or more detectors 106. These components are collectively referred to as chromatography components and are described further below. These components may be coupled to one another either directly or via a fluidic platform 108 which is also discussed further below. In addition, the chromatography system 100 may include a power supply 126 and control components 114. In one example, the power supply 126 may include a wireline that may connect the chromatography system 100 to an external source of power (e.g., a generator or public electricity supply). In another example, particularly where several of the chromatography components may be micro-scale components, the power requirements may be sufficiently minimal to allow battery operation and the power supply 126 may thus include one or more batteries.

These batteries may be, for example but without limitation, Lithium Thionyl Chloride batteries rated for high temperature environments. In yet another non-limiting example, the chromatography components may be powered via a USB connection to a computer, where information and data may also be exchanged.

In one embodiment, the chromatography system 100 may also include a carrier fluid supply 110 as well as a waste storage component 112. Having an on-board carrier fluid supply 110 may allow the chromatography system 100 to be operated downhole (or in another remote environment) without requiring connection to an external supply of the carrier fluid. In a downhole or other pressurized environment (e.g., deep underwater locations or outer space), it may be difficult, if not impossible, to vent waste fluids outside of the chromatography system 100 due to high ambient pressure or other conditions, such as environmental concerns. Therefore, the on-board waste storage component 112 may be particularly desirable. By making at least some of the system components micro-scale components, a chromatography device small enough to comply with the space constraints of down-hole environments may be realized. Micro-scale systems may of course not only be used for downhole applications.

It is to be appreciated that although embodiments of chromatography systems of the presently claimed and disclosed inventive concept(s) may be referred to herein as micro-scale systems, not all of the components are required to be micro-scale and at least some components may be meso-scale or larger. In fact, as stated above, the presently disclosed and/or claimed inventive concept(s) directed to a silica-based stationary phase substantially free of polyethers, more particularly a silica-based monolithic stationary phase substantially free of polyethers, can be used in the normal (i.e., not necessarily micro-sized) fluid analyzers (e.g., regular sized chromatographs). Additionally, as used herein, the term "micro-scale," or variations thereof, is intended to mean those structures or components having at least one relevant dimension that is in a range of about 100 nm to approximately 1 mm. In order to achieve these scales, manufacturing technologies such as silicon micro-machining, chemical etching, DRIE and other methods known to those skilled in the art may be used. Thus, for example, if the chromatography column 104 is "micro-scale" it would, in some embodiments, be constructed using a substrate (such as, but not limited to, a silicon wafer) into which are etched or machined very small channels of the micrometer-scale width. Although the overall length of such a column 104 in "micro-scale" may be a few centimeters, (in width and/or length), a relevant feature, namely, the channels, are not only micro-scale, but also may be manufactured using micro-machining (or chemical etching) techniques. Therefore, such a column may be referred to as a micro-scale column. Such columns have very low mass when packaged and therefore allow for easier thermal management compared to traditionally packaged columns. By contrast, "meso-scale" components of a chromatograph, e.g., an injector and/or detector, may have relevant dimensions that may be between several micrometers and a few millimeters and may be made using traditional manufacturing methods such as milling, grinding, glass and metal tube drawing etc. Such components tend to be bulkier than components that may be considered "micro-scale" components.

As discussed above, a chromatography system 100 according to embodiments of the presently claimed and disclosed inventive concept(s) may comprise an injector 102, at least one column 104 and at least one detector 106 interconnected via a fluidic platform 108. The fluidic platform 108 may include flow channels that provide fluid connections between the various chromatography components, as discussed further below. It is to be appreciated that various embodiments of the chromatography system 100 may include one or more columns 104 that may be disposed in a parallel or series configuration. In a parallel configuration, a sample may be directed into multiple columns 104 at the same time using, for example, a valve mechanism that couples the columns 104 to the fluidic platform 108. The output of each column 104 may be provided to one or more detectors 106. For example, the same detector 106 may be used to analyze the output of multiple columns 104 or, alternatively, some or all of the columns 104 may be provided with a dedicated detector 106. In another example, multiple detectors 106 may be used to analyze the output of one column 104. Multiple detectors 106 and/or columns 104 may be coupled together in series or parallel. In a series configuration of columns 104, the output of a first column 104 may be directed to the input of a second column 104, rather than to waste. In one example, a detector 106 may also be positioned between the two columns 104 as well as at the output of the second column 104. In another example, a detector 106 may be positioned at the output of the last column 104 of the series. It is to be appreciated that many configurations, series and parallel, are possible for multiple columns 104 and detectors 106 and that the presently claimed and disclosed inventive concept(s) is not limited to any particular configuration or to the examples discussed herein.

In one embodiment, the chromatograph 100 is in the micro-scale, wherein some or all of the chromatography components may be MEMS devices. Such devices are small and thus appropriate for a system designed to fit within the housing 101 of chromatograph 100 that is on the "micro-scale" and suitable for well-site surface use, or even down-hole deployment. In addition, such devices may be easily coupled to the fluidic platform 108. In one example, some or all of the three components 102, 104 and 106 may be MEMS devices that are approximately 2 cm by 2 cm by 1-2 mm thick. Arranged linearly, as shown, for example, in FIG. 7, these devices, when in the micro-scale form could easily be housed within a cylinder having an inner diameter of about 2 inches or less and a length of about 4 inches. However, it is to be appreciated that the injector 102, column 104 and detector 106 need not be discrete devices and also need not be linearly arranged within the housing 101. For example, the components 102, 104, and 106 could all be on a single microchip when in the micro-form. Many other configurations are also possible and are considered included in this disclosure. In addition, many variations on the size and thickness of the devices are also possible and the presently claimed and disclosed inventive concept(s) is not limited to the specific example given herein.

Figure 6A:
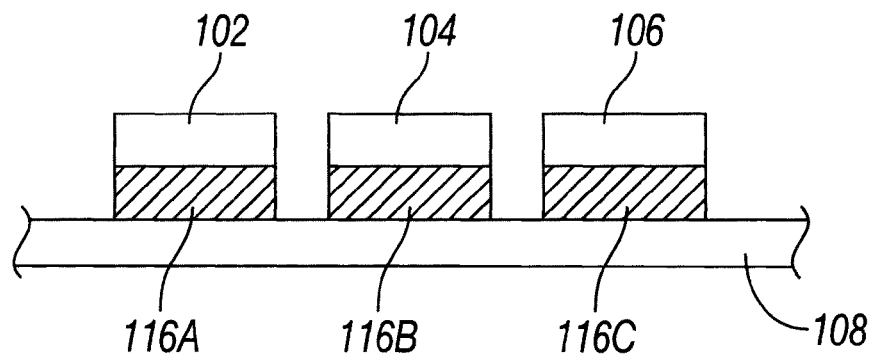
FIG. 6A is a block diagram of a component layout for a chromatography apparatus according to aspects of the presently disclosed and/or claimed inventive concepts).
Figure 6B:
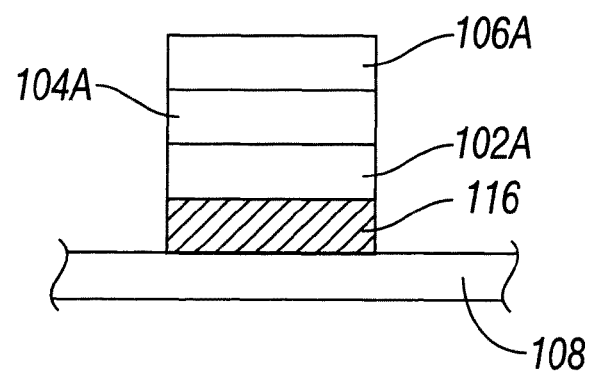
FIG. 6B is a block diagram of another component layout for a chromatography apparatus according to aspects of the presently disclosed and/or claimed inventive concept(s).
Figure 6C:
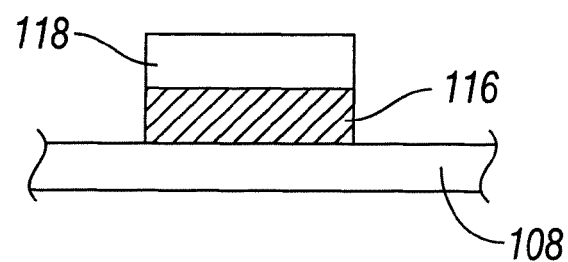
FIG. 6C is a block diagram of another component layout for a chromatography apparatus according to aspects of the presently disclosed and/or claimed inventive concept(s).

Referring to FIGS. 6A, 6B, and 6C, there are illustrated three examples of arrangements of the injector 102, column 104, and detector 106 in the micro-scale. In FIG. 6A, the chromatography components are illustrated in a linear arrangement, similar to that shown in FIG. 5. Such a linear configuration may be advantageous when it is desirable to keep the inner diameter of the housing 101 (shown in FIG. 5) in the micro-scale as small as possible and where the length of the housing 101 (shown in FIG. 5) in the micro-scale is less crucial. This configuration may also have the advantage of allowing each discrete device 102, 104 and 106 to have individual thermal management device including, for example, individual heating devices 116a, 116b, and 116c, respectively, as shown. Therefore, this linear configuration may be, in some embodiments, used in applications where the injector 102, column(s) 104, and detector(s) 106 in the micro-scale are to be operated at different temperatures. In the example illustrated in FIG. 6A, the heating elements 116a-116c are shown positioned between the respective components 102, 104 and 106 in the micro-scale and the fluidic platform 108; however, it is to be appreciated that the presently claimed and disclosed inventive concept(s) is not limited to the illustrated arrangement. For example, referring to FIG. 6B, an injector 102a, a column 104a and a detector 106a are illustrated in a stacked arrangement, one on top of the other with a heating device 116 disposed thereunder. Such a stacked arrangement may be appropriate if there is a need or desire to shorten the length of the housing 101 (shown in FIG. 5) when in the micro-scale. For example, the stacked components, along with other components making up the chromatograph system, may fit within a housing having an inner diameter of less than about 2 inches and a length of about 1.5 inches. In another embodiment, illustrated in FIG. 6C, integrated MEMS device 118 may contain an injector, column and detector disposed upon a heating device 116. In one example, such an integrated MEMS device may be less than about 2 cm by about 5 cm by about 1 to 2 mm in height. The stacked and integrated embodiments shown in FIGS. 6B and 6C may be particularly suitable for isothermal analysis where all active components are held at the same temperature. In these examples, one heater 116 may suffice for all of the injector, column and detector components.

Figure 7:
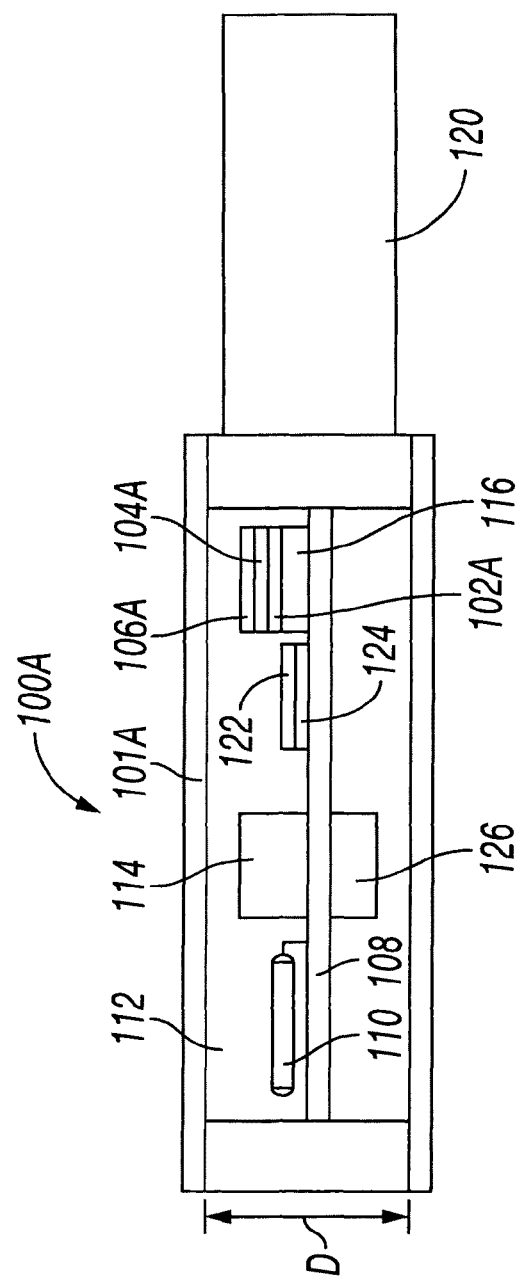
FIG. 7 is a block diagram of another embodiment of a chromatography system according to the presently disclosed and/or claimed inventive concept(s).

Referring now to FIG. 7, there is illustrated therein a block diagram of some embodiments of a chromatography apparatus 100a in the micro-scale according to the presently disclosed and/or claimed inventive concept(s). In this embodiment, an injector 102a, column 104a and detector 106a (all on the micro-scale) are shown in a stacked arrangement (e.g., as in FIG. 6B), one on top of the other. However, it is to be appreciated that any of the above-mentioned configurations of FIG. 6A-6C may be used as a micro-scale chromatograph. Also shown are some thermal management components including the heater(s) 116 discussed above and a cooler 120. These components are discussed in more detail below. In the illustrated embodiment, a housing 101a containing the chromatography components, the fluidic platform 108, carrier fluid container 110 and other components, may also serve as the waste storage container 112 (all in the micro scale).

Referring to FIG. 8, there is illustrated a top view of one example of a geometry for a micro-scale chromatography column 175 of the presently claimed and disclosed inventive concept(s) as implemented as a microchip and including embedded heating and optional cooling. In the embodiment illustrated in FIG. 8, the micro-column 175 includes a substrate 176 such as any substrate described elsewhere herein. A contiguous column micro-channel 178 is fabricated in the substrate 176, for example, by etching or micro-machining, or as other methods described herein or known in the art and provides the flow pathway for the sample through the column 175. The micro-channel 178 has deposited thereon a stationary phase coating as previously discussed herein. Ports may couple the column micro-channel 178 to, for example, a microfluidic platform (as described earlier) or to another chromatography component (e.g., a detector or second column). A second contiguous channel comprising a heating channel 180 may be fabricated in the substrate 176 interleaved with the column micro-channel 178, as shown in FIG. 8. This heating channel 180 may contain a heating element (not shown). For example, the heating element may be a resistive wire (e.g., a metallic conductor coated with a dielectric insulator) that is laid inside the heating channel 180. Alternatively, a conductive (e.g., metallic) layer may be deposited on the heating channel 180 as well as optionally on other surfaces of the microchip. The heating element (e.g., conductive layer or resistive wire) may be coupled to the power supply 126 (see FIG. 5) such that the heating element may be electrically heated to heat the column.

It is to be appreciated that the representative geometries shown in FIGS. 8 and 9 are for illustration only and are not intended to be limiting. Various other geometries are envisioned and may be apparent to those skilled in the art. In some embodiments, the cooling channel 182 may be provided on the same side of the microchip as the heating channel 180. In some embodiments, the heating channel 180 may be provided on the reverse side of the microchip. In other embodiments, either or both of the heating channel 180 and cooling channel 182 may comprise a plurality of channels, rather than a single contiguous channel. These and other modifications to the geometry that may be apparent to those skilled in the art are intended to be part of this disclosure. Furthermore, although not shown in FIGS. 8 and 9, the chromatography column may be provided with an optional low thermal mass heating device, such as a thermoelectric heating device as discussed above, in addition to the heating channel 180. In one example, such a heating device may include a low thermal mass thin-film Peltier device that may be attached to one or both sides of the microchip. The thin-film Peltier device may be approximately the same size as the microchip and may be used to provide heating and/or cooling to achieve a desired ambient or in the case of a ramped system, a desired starting temperature for the chromatography column, as discussed above. Embodiments of the micro-column thus may integrate a heater, an optional flow path for a cooling fluid, and a chromatography separation column in a MEMS device having very low thermal mass.

Rather than supplying a coolant in the cooling channel(s) 182, cooling may be achieved using air convection. The heat from the column may be transported through the silicon and/or glass substrate to the chip surfaces, then carried away by air convection. For cooling by convection, cooling channels 182 may increase the surface area of the microchip, thereby allowing for more efficient convective cooling.

More specifically, the presently disclosed and/or claimed invention is directed to a chromatography column that comprises a silica-based stationary phase that is substantially free of the above-described polyethers—more particularly, a silica-based monolithic stationary phase that is substantially free of polyethers—as produced by any one of or combination of the methods and steps thereof recited above. Likewise, the presently disclosed and/or claimed invention is directed to a chromatography apparatus comprising a chromatography column comprising a silica-based stationary phase that is substantially free of polyethers— more particularly, a silica-based monolithic stationary phase that is substantially free of polyethers—as produced by any one of or combination of the methods and steps thereof recited above.

EXAMPLES

Three different sets of experiments were carried out to illustrate: (i) the improvement of the separation performance of the presently disclosed and/or claimed silica-based monolithic stationary phase, which is substantially free of polyether(s) having at least one hydroxyl functional group (e.g., polyethylene glycol), over silica-based stationary phases that have been sputtered on the internal walls of a chromatography column using the sputtering method disclosed in US Patent Publication 2013/0174642, (ii) the improvement of the presently disclosed and/or claimed silica-based monolithic stationary phase, which is substantially free of polyether(s), over silica-based monolithic stationary phases that are not substantially free of polyether(s), and (iii) the improvement of the presently disclosed and/or claimed silica-based monolithic stationary phase, which is substantially free of polyether(s), is nearly the equivalent of a silica-based monolith stationary phase that has been calcinated at 350° C. for 3 hours to remove all polyether therefrom.

Sputtered Stationary Phase Vs. Silica-Based Monolithic Stationary Phase Substantially Free of Polyether(s) Having at Least One Hydroxyl Functional Group The comparative column (the "Sputtered Stationary Phase" Column) was produced by preparing a chromatography column having a rectangular channel of 100 µm wide, 100 µm in depth, and 2 m long and made by the sputtering process disclosed in US Patent Publication 2013/0174642.

The experimental column (i.e., a column comprising a stationary phase representative of the presently disclosed and/or claimed silica-based stationary phase) was prepared by the following:

Activation/Pre-Treatment of the Fused-Silica Capillary Column:

A fused-silica capillary column having an inner diameter of 75 µm and a length of 70 cm was treated (i.e., activated) at 40° C. with 1M sodium hydroxide for 2 hours, water for 30 minutes, 1M hydrochloric acid for 1 hour, water again for 30 minutes, and, lastly, methanol for 30 minutes. The MEMS fused-silica capillary column was then dried at 120° C. in a stream of helium for 1 hour at 5 bars of pressure.

Synthesis of the Stationary Phase:

To produce the silica-based monolithic stationary phase in the column, a sol-gel solution was first prepared by dissolving 0.150 g of polyethylene glycol (PEG) having a molar mass of 10,000 Daltons in 4 mL of 0.01 M acetic acid under stirring (400 rpm) at room temperature for 30 minutes. The mixture was then placed in an ice water bath and 2 mL of tetramethyl orthosilicate (TMOS) was added to the mixture drop by drop. The mixture was kept under stirring (400 rpm) in the ice water bath for an additional 40 minutes. Afterwards, the sol-gel was then introduced into the treated column using a precision flow controller with a pressure of 2 bars. After filling the column with the sol-gel solution, both ends of the column were sealed with rubber stoppers and the column was placed in an oven where polymerization occurred at 40° C. for 24 hours. After polymerization, the column comprising the silica-based monolithic stationary phase was washed with water for 30 minutes, and then washed with methanol for 30 minutes using a high pressure pump such as an HPLC pump at a constant pressure of 150 bars and at room temperature, wherein the washing volume was greater than 50 µL. A stream of helium was then passed through the column comprising the silica-based monolithic stationary phase at room temperature for 5 minutes at 4.14 bar prior to the column being placed in a gas chromatograph oven in order to be dried at 120° C. for 10 hours (1° C./min).

Post-Treatment of the Column

After the drying step recited above, the column was washed with a high pressure pump (e.g., the Intelligent HPLC Pump from Conquer Scientific, San Diego, Calif.) at a constant pressure of 150 bars and at room temperature using different solvents and different durations in a successive manner. In particular, the column was successively washed with acetic acid having a molarity of 1M (pH of about 2.4) for 1.5 hours, then water for 1 hour for neutralization and removal of any trace of the acid which could lead to the formation of crystals during the drying process, and lastly methanol for 1 hour to remove all traces of the water. The column was then placed in a gas chromatograph oven and dried at 120° C. for 10 hours (1° C./min).

Experimental Conditions and Results

Figure 10A:
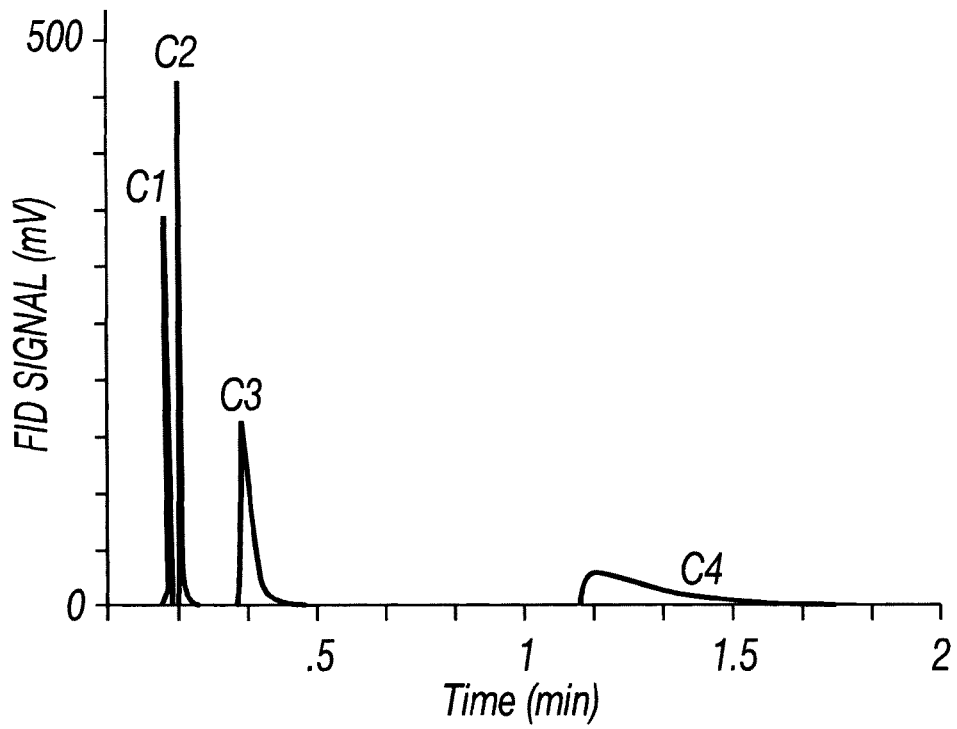
FIGS. 10A and 10B are illustrative chromatograms of the separation of a methane, ethane, propane, and n-butane mixture at a column temperature of 80° C. (isothermal), an inlet pressure of 60 psi wherein helium is the carrier gas, a detector temperature at 300° C., and the injector temperature at 40° C.
Figure 10B:
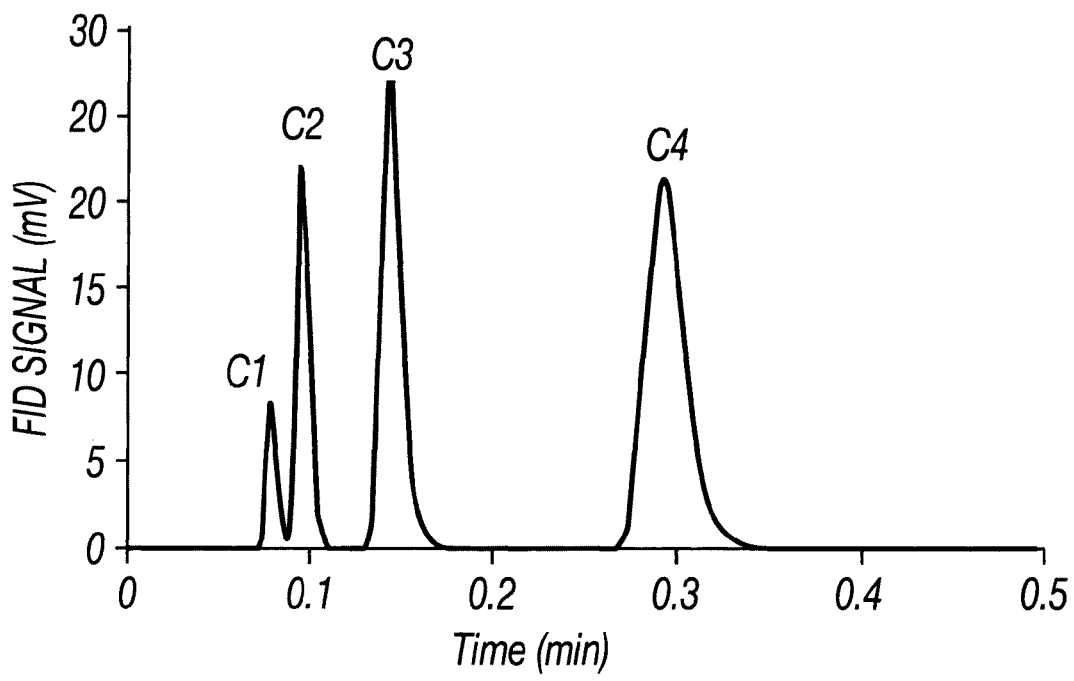

The comparative column and the experimental column were compared by analyzing a $C_1$-$C_4$ (methane, ethane, propane and n-butane) hydrocarbons gas sample of 5 µL (comprising 25 mol. % each) at a column temperature of 80° C., an inlet pressure of 60 psi, an injector temperature at 40° C., and a detector temperature at 300° C., for both columns, and using an Agilent 7820A apparatus. The results of which are presented in FIGS. 10A and 10B, wherein FIG. 10A is the chromatogram for the comparative column and FIG. 10B is the chromatogram for the experimental column. As can be seen from FIGS. 10A and 10B, n-butane (i.e., $C_4$ in the figures) has a lower overall retention time (18 seconds) in the experimental chromatography column as compared with the comparative "Sputtered Stationary Phase" column at the same high column temperature (80° C.). Additionally, it has previously been determined that chromatography columns like the comparative column comprising a stationary phase produced by the sputtering method actually perform at or near their highest performance at high temperatures ramps (e.g., from 30° C. to 150° C. at 20° C./sec), but even a column subjected to an high temperature ramp would not reach the low retention time of the experimental column.

Silica-Based Monolithic Stationary Phase Vs. Silica-Based Monolithic Stationary Phase which is Substantially Free of Polyether(s) Having at Least One Hydroxyl Functional Group The comparative column (i.e., the column comprising a silica-based monolith stationary phase that is not substantially free of polyethers was produced in the same way as the above-described experimental column but without the step(s) titled "Post-Treatment of the Column." By not carrying out the "Post-Treatment of the Column" steps, specifically washing the polymerized sol-gel with the acid, the comparative column retains the residual polyethers on/in the silica-based monolithic stationary phase.

Three different experimental columns (i.e., columns comprising a stationary phase representative of the presently disclosed and/or claimed silica-based stationary phase substantially free of polyethers) were produced using the same procedure as the above-described experimental column except that two of the experimental columns replaced the 1 M acetic acid in the "Post-Treatment of the Column" step with 5 mM $H_2SO_4$ and 1 M $H_2SO_4$, respectively. The additional experimental column used the exact same procedure as the experimental column described above—i.e., 1 M acetic acid was used in the "Post-Treatment of the Column" step.

Figure 11A:
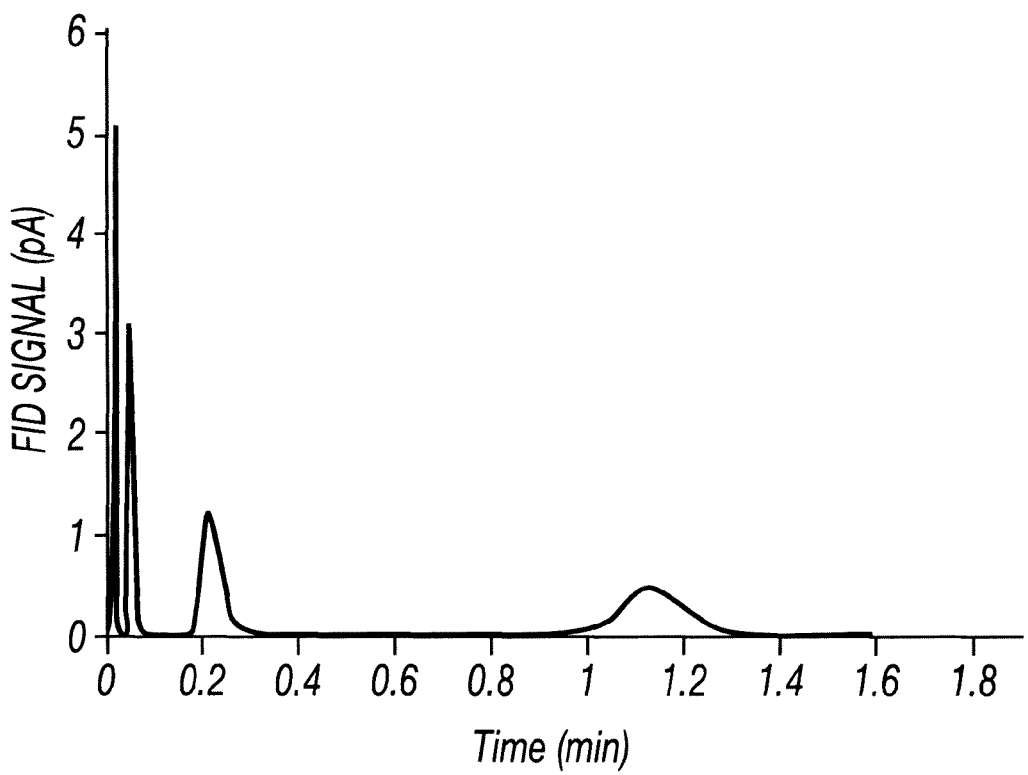
FIGS. 11A and 11B are illustrative chromatograms of the separation of a methane, ethane, propane, and n-butane mixture at a column temperature of 30° C. (isothermal), an inlet pressure of 60 psi wherein helium is the carrier gas, a detector temperature at 300° C., and the injector temperature at 120° C.
Figure 11B:
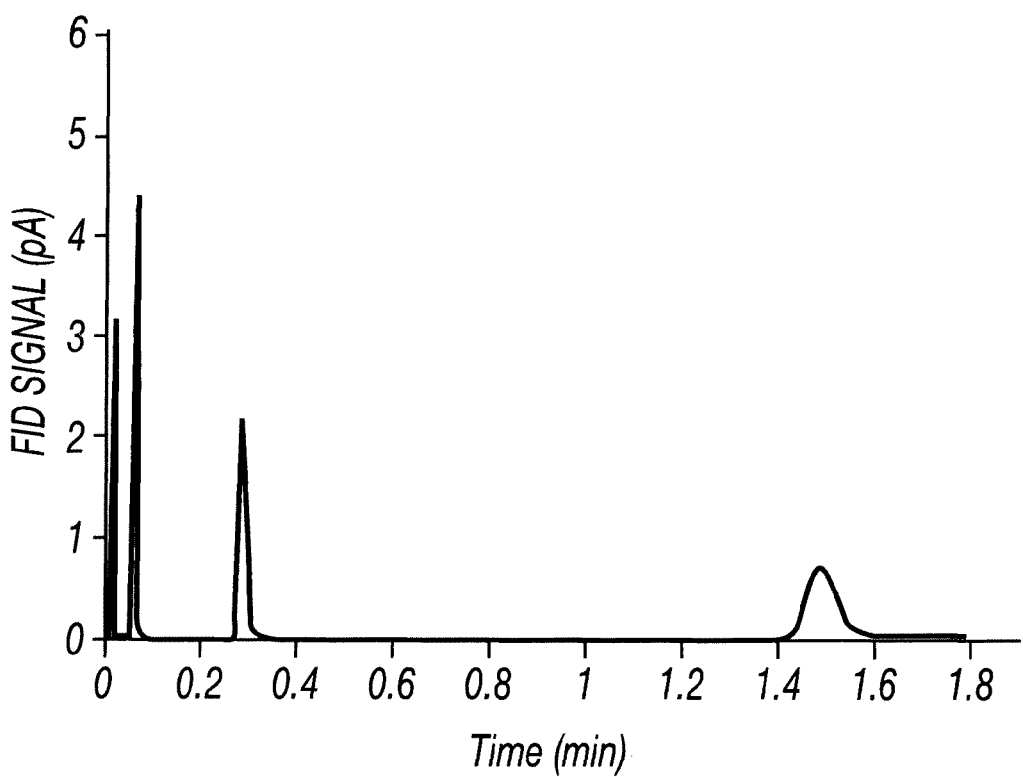

Experimental Conditions and Results for the Experimental Chromatography Column Washed with 1 M Acetic Acid and the Comparative Chromatography Column:

The comparative column and the experimental column washed with 1 M acetic acid were compared by analyzing a $C_1$-$C_4$ (methane, ethane, propane and n-butane) hydrocarbons gas sample of 5 µL (comprising 25 mol. % each) at an column temperature of 30° C., an inlet pressure of 60 psi, wherein the carrier gas was helium, an injector temperature of 120° C., and an FID detector temperature at 300° C., wherein the Make-up for the FID detector was Helium, and using an Agilent 7820A apparatus. It should be noted that the column temperature was intentionally dropped to 30° C. in order to highlight the difference in $C_1$/$C_2$ separation, which explains why the retention times for the experimental column are longer for the second experimental condition, as illustrated in FIGS. 11a and 11b. The results are presented in Table 1 (comparative column) and Table 2 (experimental column), wherein k, is the ratio of the amount of time a solute spends in the stationary phase and the mobile phase (i.e., carrier gas), $R_s$ is the methane/ethane resolution, and N is the number of theoretical plates. The retention factor, k, is also known as the partition ratio or capacity factor and provides relative retention information and N serves as a way of measuring column efficiency (efficiency increasing with N increasing). The results are also presented in FIGS. 11A and 11B, wherein FIG. 11A illustrates the chromatogram obtained for the comparative column and FIG. 11B illustrates the chromatogram obtained for the experimental column.

TABLE 1

COMPARATIVE COLUMN:
Column comprising a silica-based monolith stationary phase having polyethers thereon

|  | Methane ($C_1$) | Ethane ($C_2$) | Propane ($C_3$) | n-butane ($C_4$) |
|---|---|---|---|---|
| k | — | 2.2 | 13.0 | 72.9 |
| $R_s$ ($C_1$/$C_2$) |  | 2.8 | — | — |
| N | 116 | 114 | 138 | 320 |

TABLE 2

EXPERIMENTAL COLUMN:
Column comprising a silica-based monolith stationary phase substantially free of polyethers

|  | Methane ($C_1$) | Ethane ($C_2$) | Propane ($C_3$) | n-butane ($C_4$) |
|---|---|---|---|---|
| k | — | 2.5 | 15.2 | 83.1 |
| $R_s$ ($C_1$/$C_2$) |  | 6.9 | — | — |
| N | 238 | 957 | 1892 | 2656 |

As can be seen by comparing Tables 1 and 2 and FIGS. 11A and 11B, the retention factors for the main components of the mixture are increased greater than about 12% for the experimental column and the $C_1$/$C_2$ resolution is 2 to 3 times better and the number of theoretical plates is at least 8 times better for all components except methane which is twice as good.

Figure 12A:
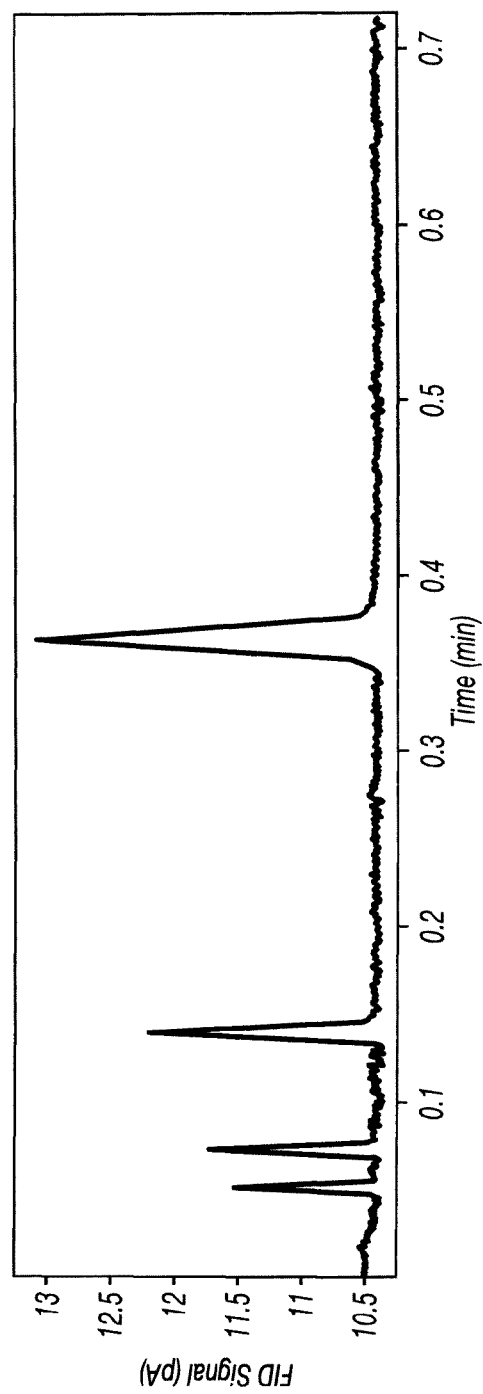
FIGS. 12A and 12B are also illustrative chromatograms of the separation of a methane, ethane, propane, and n-butane mixture at a column temperature of 60° C. (isothermal), an inlet pressure of 60 psi wherein helium is the carrier gas, a detector temperature at 300° C., and the injector temperature at 120° C.
Figure 12B:
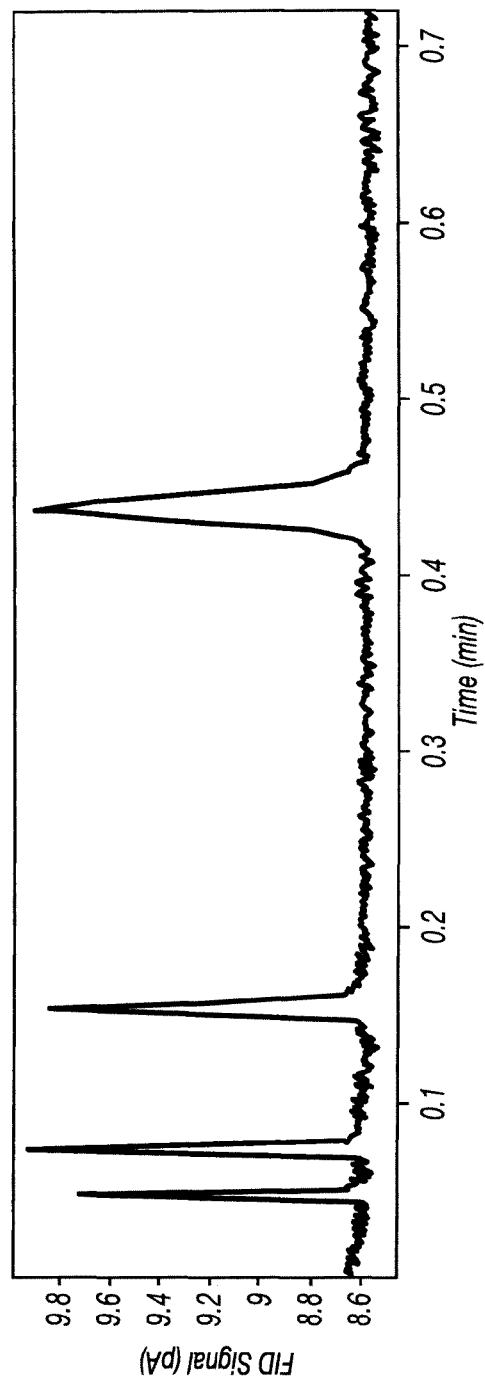

Experimental Conditions and Results for the Experimental Chromatography Column Washed with 5 mM $H_2SO_4$ and the Comparative Chromatography Column:

The comparative column and the experimental column washed with 5 mM sulfuric acid (pH of about 2) were compared by analyzing a $C_1$-$C_4$ methane, ethane, propane and n-butane) hydrocarbons gas sample of 2 µL (comprising 25 mol. % each) at an column temperature of 30° C., an inlet pressure of 60 psi, wherein the carrier gas was helium, an injector temperature of 120° C., and an FID detector temperature at 300° C., wherein the Make-up for the FID detector was Nitrogen, and using an Agilent 7820A apparatus. The results are presented in Table 3 (comparative column) and Table 4 (experimental column), wherein the retention factor, k, is the ratio of the amount of time a solute spends in the stationary phase and the mobile phase (i.e., carrier gas), $R_s$ is the methane/ethane separation factor, and N is the number of theoretical places. The retention factor, k, is also known as the partition ratio or capacity factor and provides relative retention information and N serves as a way of measuring column efficiency. The results are also presented in FIGS. 12A and 12B, wherein FIG. 12A illustrates the chromatogram obtained for the comparative column and FIG. 12B illustrates the chromatogram obtained for the experimental column.

TABLE 3

COMPARATIVE COLUMN:
Column comprising a silica-based monolith stationary phase having polyethers thereon

|  | Methane ($C_1$) | Ethane ($C_2$) | Propane ($C_3$) | n-butane ($C_4$) |
|---|---|---|---|---|
| k | — | 0.4 | 1.7 | 6.1 |
| $R_s$ ($C_1$/$C_2$) |  | 4.1 | — | — |
| N | 1844 | 2431 | 3742 | 4631 |

TABLE 4

EXPERIMENTAL COLUMN:
Column comprising a silica-based monolith stationary phase substantially free of polyethers

|  | Methane ($C_1$) | Ethane ($C_2$) | Propane ($C_3$) | n-butane ($C_4$) |
|---|---|---|---|---|
| k | — | 0.5 | 2.3 | 8.3 |
| $R_s$ ($C_1$/$C_2$) |  | 4.8 | — | — |
| N | 1676 | 2354 | 3533 | 4055 |

As can be seen by comparing Tables 3 and 4 and FIGS. 12A and 12B, the retention factors for the main components of the mixture are increased by about 25 to 36% for the experimental column and the $C_1$/$C_2$ resolution is improved by about 17%.

Figure 13A:
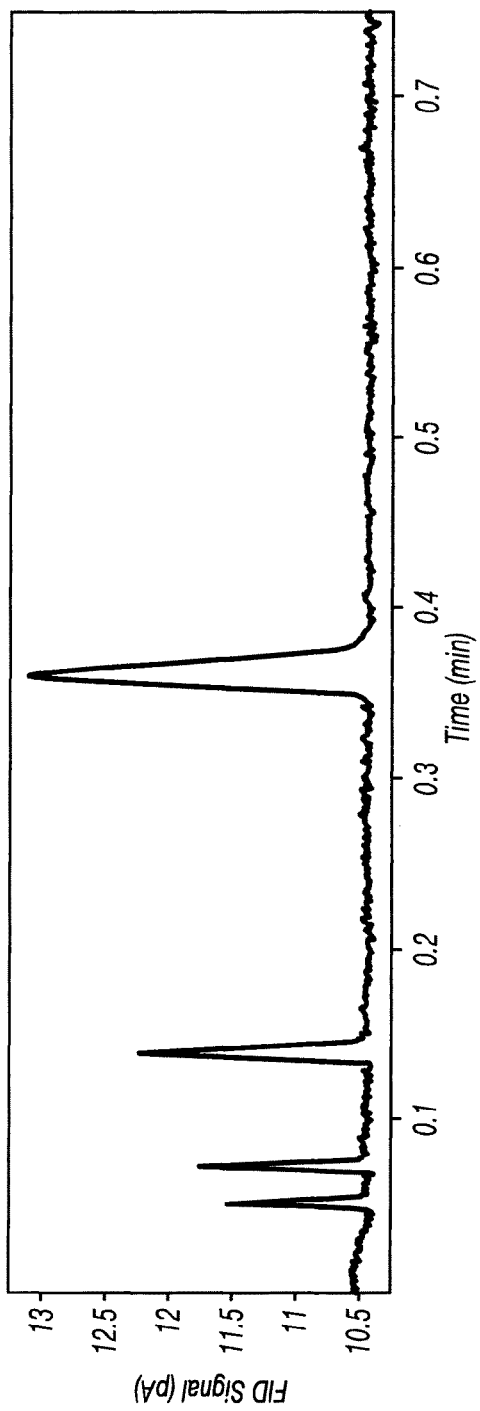
FIGS. 13A and 13B are additional illustrative chromatograms of the separation of a methane, ethane, propane, and n-butane mixture at a column temperature of 60° C. (isothermal), an inlet pressure of 60 psi wherein helium is the carrier gas, a detector temperature at 300° C., and the injector temperature at 120° C.
Figure 13B:
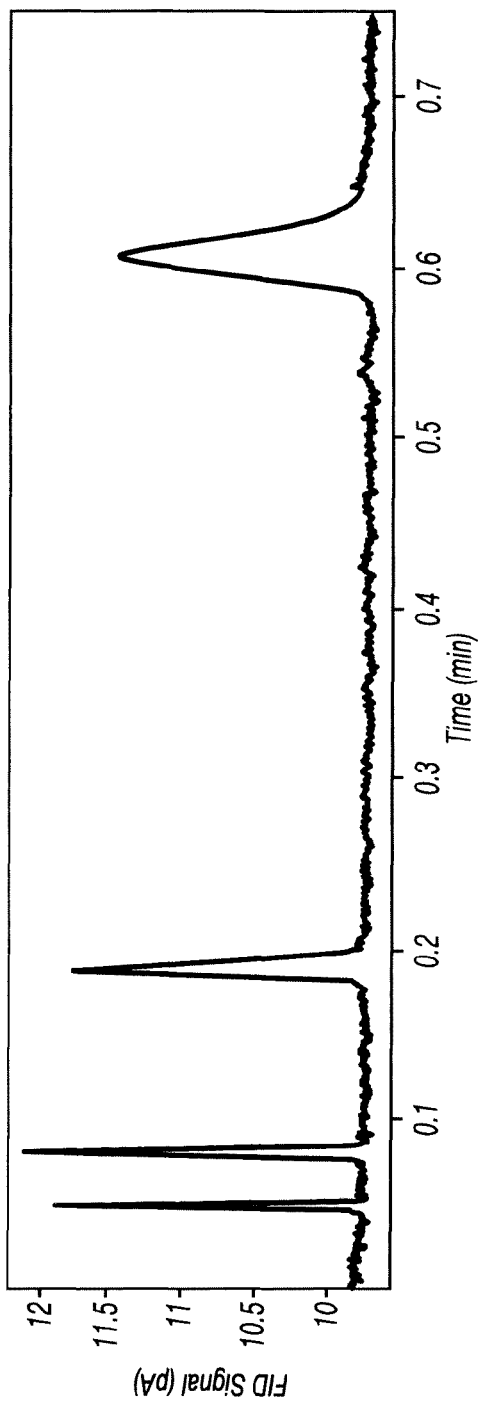

Experimental Conditions and Results for the Experimental Chromatography Column Washed with 1 M $H_2SO_4$ and the Comparative Column:

The comparative column and the experimental column washed with 1 M sulfuric acid (pH of about −0.3) were compared by analyzing a $C_1$-$C_4$ (methane, ethane, propane and n-butane) hydrocarbons gas sample of 2 µL (comprising 25 mol. % each) at an column temperature of 30° C., an inlet pressure of 60 psi, wherein the carrier gas was helium, an injector temperature of 120° C., and an FID detector temperature at 300° C., wherein the Make-up for the FID detector was Nitrogen, and using an Agilent 7820A apparatus. The results are presented in Table 5 (comparative column) and Table 6 (experimental column), wherein the retention factor, k, is the ratio of the amount of time a solute spends in the stationary phase and the mobile phase (i.e., carrier gas), $R_s$ is the methane/ethane separation factor, and N is the number of theoretical places. The retention factor, k, is also known as the partition ratio or capacity factor and provides relative retention information and N serves as a way of measuring column efficiency. The results are also presented in FIGS. 13A and 13B, wherein FIG. 13A illustrates the chromatogram obtained for the comparative column and FIG. 13B illustrates the chromatogram obtained for the experimental column.

TABLE 5

COMPARATIVE COLUMN:
Column comprising a silica-based monolith
stationary phase having polyethers thereon

| | Methane ($C_1$) | Ethane ($C_2$) | Propane ($C_3$) | n-butane ($C_4$) |
|---|---|---|---|---|
| k | — | 0.4 | 1.7 | 6.1 |
| $R_s$ ($C_1/C_2$) | | 4.1 | — | — |
| N | 1844 | 2431 | 3742 | 4631 |

TABLE 6

EXPERIMENTAL COLUMN:
Column comprising a silica-based monolith
stationary phase substantially free of polyethers

| | Methane ($C_1$) | Ethane ($C_2$) | Propane ($C_3$) | n-butane ($C_4$) |
|---|---|---|---|---|
| k | — | 0.6 | 2.8 | 11.4 |
| $R_s$ ($C_1/C_2$) | | 5.7 | — | — |
| N | 1823 | 2715 | 3597 | 3500 |

As can be seen by comparing Tables 5 and 6 and FIGS. 13A and 13B, the retention factors for the main components of the mixture are increased by about 50 to 86% for the experimental column and the $C_1/C_2$ resolution is improved by about 39%. As expected, there is a better result (i.e., retention factors increase and $C_1/C_2$ resolution improvement) for a lower pH acid due its ability to better interact with the polyether residue on the stationary phase.

Silica-Based Monolithic Stationary Phase Vs.
Silica-Based Monolithic Stationary Phase
Calcinated at 350° C. Under Pure Air The comparative column (i.e., the column comprising a silica-based monolith stationary phase that is not substantially free of polyether(s)) was produced in the same way as the above-described experimental column but without the step(s) titled "Post-Treatment of the Column." By not carrying out the "Post-Treatment of the Column" steps, specifically washing the polymerized sol-gel with the acid, the comparative column retains the residual polyether(s) on the silica-based monolithic stationary phase.

The experimental column was produced by calcinating the comparative column at 350° C. under pure air for 3 hours to effectively remove all the residual polyether on/in the silica-based monolithic stationary phase.

Figure 14A:
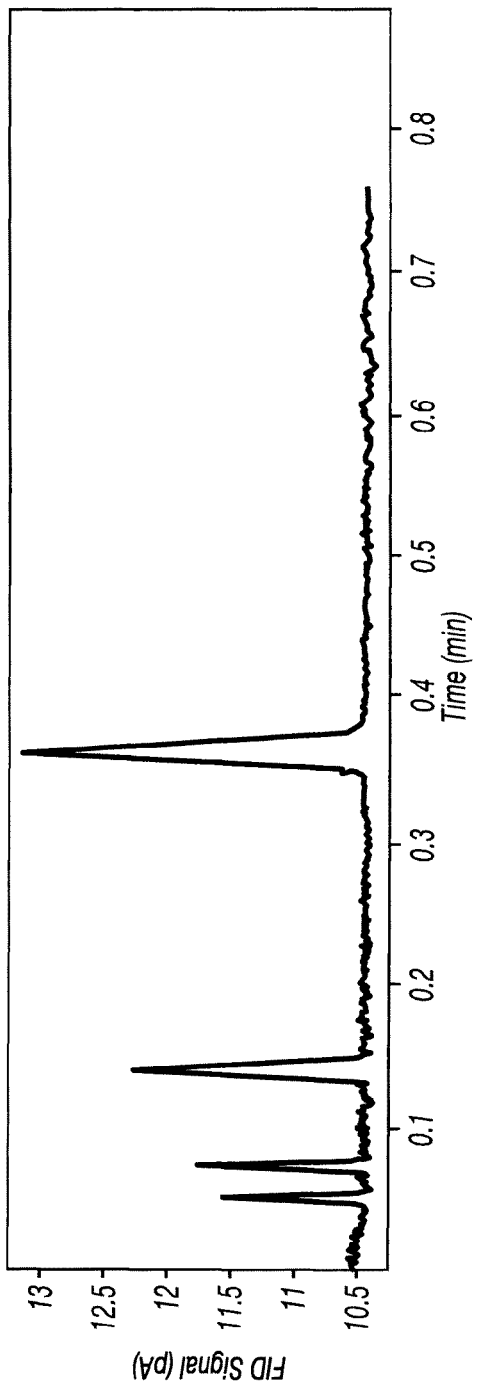
FIGS. 14A and 14B are yet further illustrative chromatograms of the separation of a methane, ethane, propane, and n-butane mixture at a column temperature of 60° C., an inlet pressure of 60 psi wherein helium is the carrier gas, a detector temperature at 300° C., and the injector temperature at 120° C.
Figure 14B:
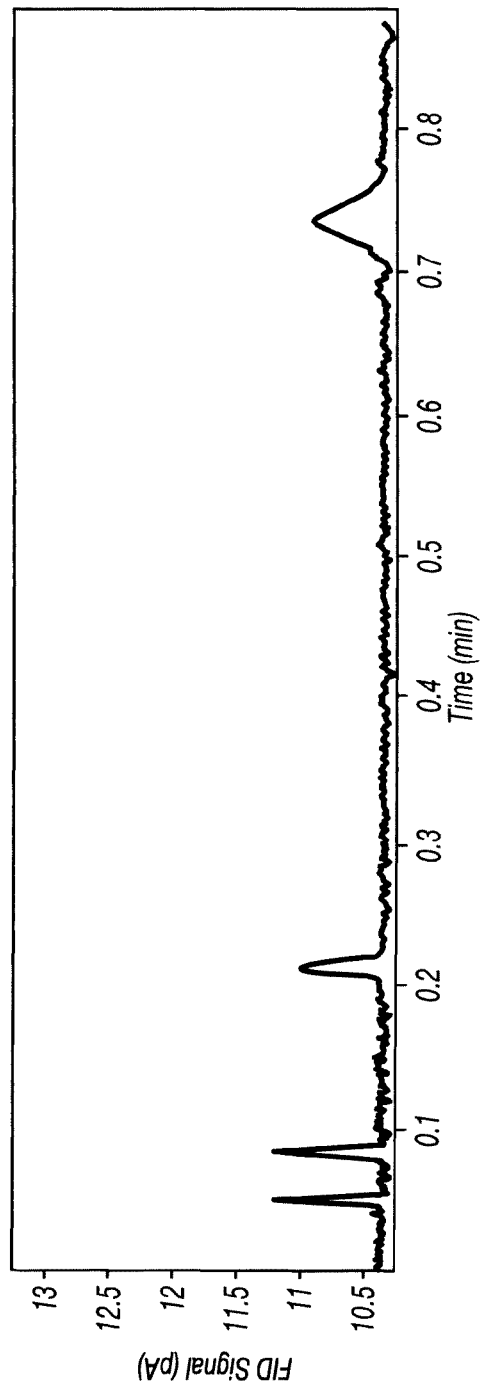

The comparative column and the experimental column calcinated at 350° C. under pure air for 3 hours were compared by analyzing a $C_1$-$C_4$ (methane, ethane, propane and n-butane) hydrocarbons gas sample of 2 µL (comprising 25 mol. % each) at an column temperature of 60° C., an inlet pressure of 60 psi, wherein the carrier gas was helium, an injector temperature of 120° C., and an FID detector temperature at 300° C., wherein the Make-up for the FID detector was Nitrogen, and using an Agilent 7820A apparatus. The results are presented in Table 7 (comparative column) and Table 8 (experimental column), wherein the retention factor, k, is the ratio of the amount of time a solute spends in the stationary phase and the mobile phase (i.e., carrier gas), $R_s$ is the methane/ethane separation factor, and N is the number of theoretical places. The retention factor, k, is also known as the partition ratio or capacity factor and provides relative retention information and N serves as a way of measuring column efficiency. The results are also presented in FIGS. 14A and 14B, wherein FIG. 14A illustrates the chromatogram obtained for the comparative column and FIG. 14B illustrates the chromatogram obtained for the experimental column.

TABLE 7

COMPARATIVE COLUMN:
Column comprising a silica-based monolith
stationary phase having polyethers thereon

| | Methane ($C_1$) | Ethane ($C_2$) | Propane ($C_3$) | n-butane ($C_4$) |
|---|---|---|---|---|
| k | — | 0.4 | 1.7 | 6.1 |
| $R_s$ ($C_1/C_2$) | | 4.1 | — | — |
| N | 1844 | 2431 | 3742 | 4631 |

TABLE 8

EXPERIMENTAL COLUMN:
Column comprising a silica-based monolith
stationary phase substantially free of polyethers

| | Methane ($C_1$) | Ethane ($C_2$) | Propane ($C_3$) | n-butane ($C_4$) |
|---|---|---|---|---|
| k | — | 0.7 | 3.3 | 13.9 |
| $R_s$ ($C_1/C_2$) | | 6.3 | — | — |
| N | 1800 | 2919 | 3852 | 3807 |

As can be seen by comparing Tables 7 and 8 and FIGS. 14A and 14B, the retention factors for the main components of the mixture are increased by about 75 to about 127% for the experimental column and the $C_1/C_2$ resolution is improved by about 53%. Additionally, the calcinated column that is free of polyethers has similar results as the previous examples that have been treated with acid to substantially remove the polyether(s) having at least one hydroxyl functional group thereon (i.e., retention factors increase and $C_1/C_2$ resolution improvement), further signifying the effectiveness of the presently disclosed and/or claimed method of removing the above-described polyether(s) from a silica-based stationary phase.

Although the preceding description has been described herein with reference to particular means, materials, and embodiments, it is not intended to be limited to the particulars disclosed herein; rather, it extends to all functionally equivalent structures, methods, and uses, such as are within the scope of the appended claims.

What is claimed is:

1. A method for the formation of a silica-based stationary phase for a chromatography column having an internal surface and a volume, wherein the silica-based stationary phase substantially fills the chromatography column forming a monolithic stationary phase within the chromatography column comprising a monolith encompassing between 50 to 100% of the volume of the chromatography column and at least a portion of the internal surface is in contact with a polymerized sol-gel comprising reaction products of a silica precursor, a polyether, and a solvent, the method comprising:

washing the chromatography column with a flow of an acid to substantially remove the polyether from the polymerized sol-gel, wherein the acid is at least one of an organic acid and a mineral acid, and further wherein the acid does not comprise hydrofluoric acid;

washing the acid-washed chromatography column with a flow of a basic neutralization solvent; and drying the neutralized chromatography column to form a silica-based stationary phase containing less than 2% of polyether having at least a hydroxyl functional group.

2. The method of claim 1, wherein the polymerized sol-gel is formed by the method comprising:

preparing a sol-gel solution comprising the silica precursor, the polyether, and the solvent;

introducing the sol-gel solution into the chromatography column such that at least a portion of the internal surface of the chromatography column is in contact with the sol-gel solution; and heating the chromatography column to polymerize the sol-gel solution.

3. The method according to claim 1, wherein the acid is an organic acid having a pH less than 5, selected from the group consisting of carboxylic acid, sulfonic acid, and combinations thereof.

4. The method of claim 3, wherein the carboxylic acid is selected from the group consisting of acetic acid, formic acid, propionic acid and combinations thereof.

5. The method according to claim 1, wherein the acid is a mineral acid having a pH less than 5, selected from the group consisting of sulfuric acid, nitric acid, hydrochloric acid, and combinations thereof.

6. The method according to claim 1, wherein the basic neutralization solvent comprises water.

7. The method according to claim 1, wherein the neutralized chromatography column is dried at a temperature in a range of from about 20° C. to about 200° C. for a time in a range of from about 0.5 to about 72 hours.

8. The method according to claim 1, wherein the neutralized chromatography column is dried at 120° C. for 10 hours.

9. The method according to claim 1, further comprising a step of washing the neutralized chromatography column with a water-miscible solvent prior to the drying step.

10. The method of claim 9, wherein the water-miscible solvent is an organic solvent selected from the group consisting of alcohols, acetone, butanone, ethyl acetate, and combinations thereof.

11. The method of claim 9, wherein the water-miscible solvent is an alcohol selected from the group consisting of methanol, ethanol, n-propanol, iso-propanol, tert-butanol, and combinations thereof.

12. The method according to claim 1, wherein the chromatography column is selected from the group consisting of a Micro-Electro-Mechanical-System (MEMS) column, fused-silica capillary column, microfabricated gas chromatography column, and combinations thereof.

13. An apparatus comprising a chromatography column having a silica-based stationary phase substantially free of a polyether, produced by the method of claim 1.

* * * * *